United States Patent
Digrigoli et al.

(10) Patent No.: US 10,002,354 B2
(45) Date of Patent: *Jun. 19, 2018

(54) MULTI CURRENCY EXCHANGES BETWEEN PARTICIPANTS

(71) Applicant: PAYPAL INC., San Jose, CA (US)

(72) Inventors: Giacomo Digrigoli, San Francisco, CA (US); George Lee, Mountain View, CA (US)

(73) Assignee: PAYPAL, INC., San Jose, CA (US)

(*) Notice: Subject to any disclaimer, the term of this patent is extended or adjusted under 35 U.S.C. 154(b) by 0 days. days.

This patent is subject to a terminal disclaimer.

(21) Appl. No.: 14/263,874

(22) Filed: Apr. 28, 2014

(65) Prior Publication Data

US 2014/0236815 A1    Aug. 21, 2014

Related U.S. Application Data

(63) Continuation of application No. 13/567,902, filed on Aug. 6, 2012, now Pat. No. 8,712,913, which is a
(Continued)

(51) Int. Cl.
  *G06Q 20/38*    (2012.01)
  *G06Q 20/10*    (2012.01)
(Continued)

(52) U.S. Cl.
  CPC .......... *G06Q 20/381* (2013.01); *G06Q 20/10* (2013.01); *G06Q 20/102* (2013.01); *G06Q 20/40* (2013.01); *G06Q 30/06* (2013.01); *G06Q 40/12* (2013.12)

(58) Field of Classification Search
  CPC ........ G06Q 10/00; G06Q 20/00; G06Q 30/00; G06Q 40/00; G05Q 40/00
(Continued)

(56) References Cited

U.S. PATENT DOCUMENTS 3,573,747 A    4/1971    Adams et al.
3,581,072 A    5/1971    Nymeyer
(Continued)

FOREIGN PATENT DOCUMENTS

CA    2253543 A1    3/1997
CN    1139782       1/1997
(Continued)

OTHER PUBLICATIONS

"U.S. Appl. No. 09/905,525, Advisory Action dated May 2, 2008", 5 pgs.
(Continued)

*Primary Examiner* — Frantzy Poinvil
(74) *Attorney, Agent, or Firm* — Haynes & Boone, LLP

(57) ABSTRACT

A method and apparatus for facilitating payment transactions in multiple currencies between participants is provided. In one embodiment, an option is provided to a user to select a currency in which to make a payment. An indication of the selected currency in which to make the payment is received. A determination is made as to whether the selected currency is a primary currency of an account of the user. Based on the selected currency being different from the primary currency of the account of the user, the payment is converted to the selected currency.

20 Claims, 15 Drawing Sheets

Related U.S. Application Data continuation of application No. 13/212,994, filed on Aug. 18, 2011, now Pat. No. 8,249,990, which is a continuation of application No. 12/818,935, filed on Jun. 18, 2010, now Pat. No. 8,055,582, which is a continuation of application No. 10/608,525, filed on Jun. 26, 2003, now Pat. No. 7,742,985.

(51) Int. Cl.
 *G06Q 20/40* (2012.01)
 *G06Q 30/06* (2012.01)
 *G06Q 40/00* (2012.01)

(58) Field of Classification Search
 USPC .................................................. 705/3–44
 See application file for complete search history.

(56) References Cited

U.S. PATENT DOCUMENTS

| | | |
|---|---|---|
| 3,652,795 A | 3/1972 | Wolf et al. |
| 4,251,867 A | 2/1981 | Uchida et al. |
| 4,412,287 A | 10/1983 | Braddock, III |
| 4,674,044 A | 6/1987 | Kalmus et al. |
| 4,677,552 A | 6/1987 | Sibley, Jr. |
| 4,766,293 A | 8/1988 | Boston |
| 4,789,928 A | 12/1988 | Fujisaki |
| 4,799,156 A | 1/1989 | Shavit et al. |
| 4,812,628 A | 3/1989 | Boston et al. |
| 4,823,264 A | 4/1989 | Deming |
| 4,823,265 A | 4/1989 | Nelson |
| 4,833,607 A | 5/1989 | Dethloff |
| 4,837,422 A | 6/1989 | Dethloff et al. |
| 4,864,516 A | 9/1989 | Gaither et al. |
| 4,877,947 A | 10/1989 | Mori |
| 4,903,201 A | 2/1990 | Wagner |
| 4,949,256 A | 8/1990 | Humble |
| 4,968,873 A | 11/1990 | Dethloff et al. |
| 4,982,346 A | 1/1991 | Girouard |
| 5,056,019 A | 10/1991 | Schultz et al. |
| 5,063,507 A | 11/1991 | Lindsey et al. |
| 5,063,523 A | 11/1991 | Vrenjak |
| 5,076,433 A | 12/1991 | Howes |
| 5,077,665 A | 12/1991 | Silverman et al. |
| 5,101,353 A | 3/1992 | Lupien et al. |
| 5,128,752 A | 7/1992 | Von Kohorn |
| 5,136,501 A | 8/1992 | Silverman et al. |
| 5,168,446 A | 12/1992 | Wiseman |
| 5,202,826 A | 4/1993 | McCarthy |
| 5,205,200 A | 4/1993 | Wright |
| 5,243,515 A | 9/1993 | Lee |
| 5,258,908 A | 11/1993 | Hartheimer et al. |
| 5,262,942 A | 11/1993 | Earle |
| 5,280,422 A | 1/1994 | Moe et al. |
| 5,287,268 A | 2/1994 | McCarthy |
| 5,297,031 A | 3/1994 | Gutterman et al. |
| 5,297,032 A | 3/1994 | Trojan et al. |
| 5,305,200 A | 4/1994 | Hartheimer et al. |
| 5,325,297 A | 6/1994 | Bird et al. |
| 5,329,589 A | 7/1994 | Fraser et al. |
| 5,349,368 A | 9/1994 | Takeda et al. |
| 5,369,705 A | 11/1994 | Bird et al. |
| 5,375,055 A | 12/1994 | Togher et al. |
| 5,380,991 A | 1/1995 | Valencia |
| 5,384,701 A | 1/1995 | Stentiford et al. |
| 5,394,324 A | 2/1995 | Clearwater |
| 5,401,946 A | 3/1995 | Weinblatt |
| 5,418,949 A | 5/1995 | Suzuki |
| 5,426,281 A | 6/1995 | Abecassis |
| 5,434,978 A | 7/1995 | Dockter et al. |
| 5,440,634 A | 8/1995 | Jones et al. |
| 5,442,546 A | 8/1995 | Kaji et al. |
| 5,442,782 A | 8/1995 | Malatesta et al. |
| 5,453,601 A | 9/1995 | Rosen |
| 5,455,407 A | 10/1995 | Rosen |
| 5,485,510 A | 1/1996 | Colbert |
| 5,497,319 A | 3/1996 | Chong et al. |
| 5,535,276 A | 7/1996 | Ganesan |
| 5,535,403 A | 7/1996 | Li et al. |
| 5,537,314 A | 7/1996 | Kanter |
| 5,544,051 A | 8/1996 | Senn et al. |
| 5,553,145 A | 9/1996 | Micali |
| 5,557,518 A | 9/1996 | Rosen |
| 5,557,728 A | 9/1996 | Garrett et al. |
| 5,567,740 A | 10/1996 | Free |
| 5,592,668 A | 1/1997 | Harding et al. |
| 5,596,994 A | 1/1997 | Bro |
| 5,598,557 A | 1/1997 | Doner et al. |
| 5,600,833 A | 2/1997 | Senn et al. |
| 5,638,457 A | 6/1997 | Deaton |
| 5,640,569 A | 6/1997 | Miller et al. |
| 5,644,721 A | 7/1997 | Chung et al. |
| 5,652,896 A | 7/1997 | Yamauchi et al. |
| 5,657,389 A | 8/1997 | Houvener |
| 5,659,165 A | 8/1997 | Jennings et al. |
| 5,664,115 A | 9/1997 | Fraser |
| 5,671,364 A | 9/1997 | Turk |
| 5,687,323 A | 11/1997 | Hodroff |
| 5,689,652 A | 11/1997 | Lupien et al. |
| 5,694,546 A | 12/1997 | Reisman |
| 5,696,909 A | 12/1997 | Wallner |
| 5,706,457 A | 1/1998 | Dwyer et al. |
| 5,710,886 A | 1/1998 | Christensen et al. |
| 5,710,889 A | 1/1998 | Clark et al. |
| 5,715,314 A | 2/1998 | Payne et al. |
| 5,715,399 A | 2/1998 | Bezos |
| 5,715,402 A | 2/1998 | Popolo |
| 5,717,989 A | 2/1998 | Tozzoli et al. |
| 5,722,418 A | 3/1998 | Bro |
| 5,724,524 A | 3/1998 | Hunt et al. |
| 5,724,593 A | 3/1998 | Hargrave, III et al. |
| 5,727,165 A | 3/1998 | Ordish et al. |
| 5,729,594 A | 3/1998 | Klingman |
| 5,734,838 A | 3/1998 | Robinson et al. |
| 5,740,252 A | 4/1998 | Minor et al. |
| 5,757,917 A | 5/1998 | Rose et al. |
| 5,758,126 A | 5/1998 | Daniels et al. |
| 5,761,648 A | 6/1998 | Golden et al. |
| 5,771,291 A | 6/1998 | Newton et al. |
| 5,771,380 A | 6/1998 | Tanaka et al. |
| 5,774,553 A | 6/1998 | Rosen |
| 5,774,870 A | 6/1998 | Storey |
| 5,778,178 A | 7/1998 | Arunachalum |
| 5,778,213 A | 7/1998 | Shakib et al. |
| 5,778,356 A | 7/1998 | Heinu |
| 5,787,386 A | 7/1998 | Kaplan et al. |
| 5,787,402 A | 7/1998 | Potter et al. |
| 5,790,790 A | 8/1998 | Smith et al. |
| 5,794,210 A | 8/1998 | Goldhaber et al. |
| 5,794,219 A | 8/1998 | Brown |
| 5,799,285 A | 8/1998 | Klingman |
| 5,803,500 A | 9/1998 | Mossberg |
| 5,806,044 A | 9/1998 | Powell |
| 5,818,914 A | 10/1998 | Fujisaki |
| 5,822,737 A | 10/1998 | Ogram |
| 5,826,241 A | 10/1998 | Stein et al. |
| 5,826,244 A | 10/1998 | Huberman |
| 5,852,880 A | 10/1998 | Sudia et al. |
| 5,835,896 A | 11/1998 | Fisher et al. |
| 5,835,911 A | 11/1998 | Nakagawa et al. |
| 5,845,143 A | 12/1998 | Yamauchi et al. |
| 5,845,265 A | 12/1998 | Woolston |
| 5,845,266 A | 12/1998 | Lupien et al. |
| 5,846,265 A | 12/1998 | McGregor et al. |
| 5,850,442 A | 12/1998 | Muftic |
| 5,854,997 A | 12/1998 | Sukeda et al. |
| 5,855,007 A | 12/1998 | Jovicic et al. |
| 5,855,008 A | 12/1998 | Goldhaber et al. |
| 5,857,188 A | 1/1999 | Douglas |
| 5,857,201 A | 1/1999 | Wright et al. |
| 5,857,203 A | 1/1999 | Kauffman et al. |
| 5,870,722 A | 2/1999 | Albert et al. |
| 5,872,848 A | 2/1999 | Romney et al. |
| 5,873,069 A | 2/1999 | Reuhl et al. |

(56) References Cited

U.S. PATENT DOCUMENTS

| | | | |
|---|---|---|---|
| 5,874,412 A | 2/1999 | Priebe et al. |
| 5,883,620 A | 3/1999 | Hobbs |
| 5,884,056 A | 3/1999 | Steele |
| 5,884,246 A | 3/1999 | Boucher et al. |
| 5,884,247 A | 3/1999 | Christy |
| 5,884,277 A | 3/1999 | Khosla |
| 5,890,138 A | 3/1999 | Godin et al. |
| 5,897,621 A | 4/1999 | Boesch et al. |
| 5,897,622 A | 4/1999 | Blinn et al. |
| 5,903,874 A | 5/1999 | Leonard |
| 5,905,974 A | 5/1999 | Fraser et al. |
| 5,905,975 A | 5/1999 | Ausubel |
| 5,909,544 A | 6/1999 | Anderson et al. |
| 5,913,203 A | 6/1999 | Wong et al. |
| 5,917,484 A | 6/1999 | Mullaney |
| 5,922,074 A | 7/1999 | Richard et al. |
| 5,924,072 A | 7/1999 | Havens |
| 5,926,794 A | 7/1999 | Fethe |
| 5,944,790 A | 8/1999 | Levy |
| 5,945,652 A | 8/1999 | Ohki |
| 5,945,653 A | 8/1999 | Walker et al. |
| 5,953,423 A | 9/1999 | Rosen |
| 5,956,694 A | 9/1999 | Powell |
| 5,960,382 A | 9/1999 | Steiner |
| 5,960,409 A | 9/1999 | Wexler |
| 5,963,647 A * | 10/1999 | Downing et al. ............... 705/39 |
| 5,963,917 A | 10/1999 | Ogram |
| 5,963,923 A | 10/1999 | Garber |
| 5,966,685 A | 10/1999 | Flanagan et al. |
| 5,969,974 A | 10/1999 | Vandenbelt et al. |
| 5,970,469 A | 10/1999 | Scroggie et al. |
| 5,971,274 A | 10/1999 | Milchman |
| 5,974,412 A | 10/1999 | Hazlehurst et al. |
| 5,983,196 A | 11/1999 | Wendkos |
| 5,987,500 A | 11/1999 | Arunachalam |
| 5,991,739 A | 11/1999 | Cupps et al. |
| 5,999,913 A | 12/1999 | Goodwin, III |
| 6,006,221 A | 12/1999 | Liddy et al. |
| 6,009,412 A | 12/1999 | Storey |
| 6,014,634 A | 1/2000 | Scroggie et al. |
| 6,014,635 A | 1/2000 | Harris et al. |
| 6,016,955 A | 1/2000 | DeRooij et al. |
| 6,018,721 A | 1/2000 | Aziz et al. |
| 6,018,742 A | 1/2000 | Herbert, III |
| 6,029,015 A | 2/2000 | Ishiguro |
| 6,029,141 A | 2/2000 | Bezos et al. |
| 6,029,150 A | 2/2000 | Kravitz |
| 6,035,280 A | 3/2000 | Christensen |
| 6,035,288 A | 3/2000 | Solomon |
| 6,035,402 A | 3/2000 | Vaeth et al. |
| 6,039,244 A | 3/2000 | Finsterwald |
| 6,044,363 A | 3/2000 | Mori et al. |
| 6,047,264 A | 4/2000 | Fisher et al. |
| 6,047,274 A | 4/2000 | Johnson |
| 6,052,670 A | 4/2000 | Johnson |
| 6,055,518 A | 4/2000 | Franklin et al. |
| 6,058,379 A | 5/2000 | Odom et al. |
| 6,058,417 A | 5/2000 | Hess et al. |
| 6,061,448 A | 5/2000 | Smith et al. |
| 6,069,939 A | 5/2000 | Fung et al. |
| 6,073,117 A | 6/2000 | Oyanagi et al. |
| 6,077,085 A | 6/2000 | Parry et al. |
| 6,085,169 A | 7/2000 | Walker et al. |
| 6,085,176 A | 7/2000 | Woolston |
| 6,092,035 A | 7/2000 | Kurachi et al. |
| 6,092,037 A | 7/2000 | Stone et al. |
| 6,095,410 A | 8/2000 | Andersen et al. |
| 6,101,485 A | 8/2000 | Fortenberry et al. |
| 6,104,815 A | 8/2000 | Alcorn et al. |
| 6,105,001 A | 8/2000 | Masi |
| 6,105,008 A | 8/2000 | Davis et al. |
| 6,119,137 A | 9/2000 | Smith et al. |
| 6,119,229 A | 9/2000 | Martinez et al. |
| 6,122,355 A | 9/2000 | Strohl |
| 6,122,606 A | 9/2000 | Johnson |
| 6,134,533 A | 10/2000 | Shell |
| 6,138,106 A | 10/2000 | Walker et al. |
| 6,138,107 A | 10/2000 | Elgamal |
| 6,141,653 A | 10/2000 | Conklin et al. |
| 6,144,984 A | 11/2000 | DeBenedictis et al. |
| 6,151,589 A | 11/2000 | Aggarwal et al. |
| 6,161,082 A | 12/2000 | Goldberg et al. |
| 6,173,267 B1 | 1/2001 | Cairns |
| 6,178,408 B1 | 1/2001 | Copple et al. |
| 6,192,407 B1 | 2/2001 | Smith et al. |
| 6,199,079 B1 | 3/2001 | Gupta |
| 6,202,051 B1 | 3/2001 | Woolston |
| 6,205,418 B1 | 3/2001 | Li et al. |
| 6,205,433 B1 | 3/2001 | Boesch et al. |
| 6,212,556 B1 | 4/2001 | Arunachalam |
| 6,226,412 B1 | 5/2001 | Schwab |
| 6,237,145 B1 | 5/2001 | Narasimhan et al. |
| 6,243,691 B1 | 6/2001 | Fisher et al. |
| 6,246,996 B1 | 6/2001 | Stein et al. |
| 6,266,651 B1 | 7/2001 | Woolston |
| 6,266,652 B1 | 7/2001 | Godin et al. |
| 6,269,345 B1 | 7/2001 | Riboud |
| 6,272,675 B1 | 8/2001 | Schrab et al. |
| 6,275,789 B1 | 8/2001 | Moser et al. |
| 6,278,969 B1 | 8/2001 | King et al. |
| 6,278,980 B1 | 8/2001 | Wendkos |
| 6,282,507 B1 | 8/2001 | Horiguchi et al. |
| 6,292,769 B1 | 9/2001 | Flanagan et al. |
| 6,301,554 B1 | 10/2001 | Christy |
| 6,308,172 B1 | 10/2001 | Agrawal et al. |
| 6,317,727 B1 | 11/2001 | May |
| 6,321,208 B1 | 11/2001 | Barnett et al. |
| 6,321,210 B1 | 11/2001 | O'Brien et al. |
| 6,326,985 B1 | 12/2001 | Tazoe et al. |
| 6,330,543 B1 | 12/2001 | Kepecs |
| 6,332,126 B1 | 12/2001 | Peirce et al. |
| 6,336,009 B1 | 1/2002 | Suzumi et al. |
| 6,336,098 B1 | 1/2002 | Fortenberry et al. |
| 6,336,099 B1 | 1/2002 | Barnett et al. |
| 6,336,105 B1 | 1/2002 | Conklin et al. |
| 6,339,755 B1 | 1/2002 | Hetherington et al. |
| 6,341,958 B1 | 1/2002 | Zilberman |
| 6,349,275 B1 | 2/2002 | Schumacher et al. |
| 6,356,865 B1 | 3/2002 | Franz et al. |
| 6,363,337 B1 | 3/2002 | Amith |
| 6,386,446 B1 | 5/2002 | Himmel et al. |
| 6,389,427 B1 | 5/2002 | Faulkner |
| 6,396,515 B1 | 5/2002 | Hetherington et al. |
| 6,401,077 B1 | 6/2002 | Godden et al. |
| 6,415,270 B1 | 7/2002 | Rackson et al. |
| 6,421,653 B1 | 7/2002 | May |
| 6,438,524 B1 | 8/2002 | Shi |
| 6,446,048 B1 | 9/2002 | Wells et al. |
| 6,450,407 B1 | 9/2002 | Freeman et al. |
| 6,460,015 B1 | 10/2002 | Hetherington et al. |
| 6,460,020 B1 | 10/2002 | Pool et al. |
| 6,463,404 B1 | 10/2002 | Appleby |
| 6,473,729 B1 | 10/2002 | Gastaldo et al. |
| 6,490,602 B1 | 12/2002 | Kraemer et al. |
| 6,493,661 B1 | 12/2002 | White, III et al. |
| 6,496,793 B1 | 12/2002 | Veditz et al. |
| 6,505,168 B1 | 1/2003 | Rothman et al. |
| 6,507,813 B2 | 1/2003 | Veditz et al. |
| 6,523,000 B1 | 2/2003 | Ando et al. |
| 6,523,012 B1 | 2/2003 | Glassman et al. |
| 6,526,426 B1 | 2/2003 | Lakritz |
| 6,532,444 B1 | 3/2003 | Weber |
| 6,556,975 B1 | 4/2003 | Wittsche |
| 6,567,821 B1 | 5/2003 | Polk |
| 6,570,591 B1 | 5/2003 | Crovetto et al. |
| 6,571,216 B1 | 5/2003 | Garg et al. |
| 6,571,241 B1 | 5/2003 | Nosohara |
| 6,574,239 B1 | 6/2003 | Dowling et al. |
| 6,578,012 B1 | 6/2003 | Storey |
| 6,594,640 B1 | 7/2003 | Postrel |
| 6,598,026 B1 | 7/2003 | Ojha et al. |
| 6,598,028 B1 | 7/2003 | Sullivan et al. |
| 6,604,107 B1 | 8/2003 | Wang |
| 6,623,529 B1 | 9/2003 | Lakritz |

(56) References Cited

U.S. PATENT DOCUMENTS

| | | |
|---|---|---|
| 6,628,307 B1 | 9/2003 | Fair |
| 6,643,624 B2 | 11/2003 | Philippe |
| 6,647,364 B1 | 11/2003 | Yumura et al. |
| 6,647,373 B1 | 11/2003 | Carlton-Foss |
| 6,651,220 B1 | 11/2003 | Penteroudakis et al. |
| 6,665,676 B2 | 12/2003 | Twig et al. |
| 6,721,715 B2 | 4/2004 | Nemzow |
| 6,732,161 B1 | 5/2004 | Hess et al. |
| 6,748,367 B1 | 6/2004 | Lee |
| 6,771,291 B1 | 8/2004 | DiStefano |
| 6,799,165 B1 | 9/2004 | Boesjes |
| 6,839,683 B1 | 1/2005 | Walker et al. |
| 6,842,739 B2 | 1/2005 | Postrel |
| 6,857,022 B1 | 2/2005 | Scanlon |
| 6,865,547 B1 | 3/2005 | Brake, Jr. et al. |
| 6,895,386 B1 | 5/2005 | Bachman et al. |
| 6,901,408 B2 | 5/2005 | Fachat et al. |
| 6,912,539 B1 | 6/2005 | Kapitanski et al. |
| 6,965,882 B1 | 11/2005 | Lapstun et al. |
| 6,999,932 B1 | 2/2006 | Zhou |
| 7,007,026 B2 | 2/2006 | Wilkinson et al. |
| 7,013,289 B2 | 3/2006 | Horn et al. |
| 7,031,985 B1 | 4/2006 | Pecheny |
| 7,072,826 B1 | 7/2006 | Wakita |
| 7,076,453 B2 | 7/2006 | Jammes et al. |
| 7,133,835 B1 | 11/2006 | Fusz et al. |
| 7,136,863 B2 | 11/2006 | Wang |
| 7,162,436 B1 | 1/2007 | Eckel, Jr. |
| 7,165,041 B1 | 1/2007 | Guheen et al. |
| 7,191,393 B1 | 3/2007 | Chin et al. |
| 7,194,403 B2 | 3/2007 | Okura et al. |
| 7,206,768 B1 | 4/2007 | deGroeve et al. |
| 7,234,110 B2 | 6/2007 | Sumitomo |
| 7,251,612 B1 | 7/2007 | Parker et al. |
| 7,315,613 B2 | 1/2008 | Kleindienst et al. |
| 7,315,826 B1 | 1/2008 | Guheen et al. |
| 7,318,049 B2 | 1/2008 | Iannacci |
| 7,337,133 B1 | 2/2008 | Bezos et al. |
| 7,340,389 B2 | 3/2008 | Vargas |
| 7,398,229 B2 | 7/2008 | Budish |
| 7,418,390 B1 | 8/2008 | Jokipii |
| 7,458,507 B2 | 12/2008 | Fillinger et al. |
| 7,540,408 B2 * | 6/2009 | Levine et al. ............ 235/379 |
| 7,599,857 B2 | 10/2009 | Bishop et al. |
| 7,644,037 B1 | 1/2010 | Ostrovsky |
| 7,660,740 B2 | 2/2010 | Boone et al. |
| 7,742,985 B1 | 6/2010 | Digrigoli et al. |
| 7,752,034 B2 | 7/2010 | Brockett et al. |
| 7,752,266 B2 | 7/2010 | Grove |
| 7,801,816 B2 | 9/2010 | Alarcon-luther et al. |
| 7,856,384 B1 | 12/2010 | Kulasooriya et al. |
| 7,895,082 B2 | 2/2011 | Veres et al. |
| 7,908,132 B2 | 3/2011 | Brockett et al. |
| 7,941,348 B2 | 5/2011 | Veres et al. |
| 8,050,957 B2 | 11/2011 | Woehler |
| 8,055,582 B2 * | 11/2011 | Digrigoli et al. ............ 705/39 |
| 8,078,505 B2 | 12/2011 | Veres et al. |
| 8,249,990 B2 | 8/2012 | Digrigoli et al. |
| 8,255,286 B2 | 8/2012 | Veres et al. |
| 8,266,016 B2 | 9/2012 | Boone et al. |
| 8,442,871 B2 | 5/2013 | Veres et al. |
| 8,712,913 B2 | 4/2014 | Digrigoli et al. |
| 8,732,037 B2 | 5/2014 | Boone et al. |
| 8,831,986 B2 * | 9/2014 | Agarwal et al. ............ 705/35 |
| 2001/0007099 A1 | 7/2001 | Rau et al. |
| 2001/0009005 A1 | 7/2001 | Godin et al. |
| 2001/0011241 A1 | 8/2001 | Nemzow |
| 2001/0023407 A1 | 9/2001 | Liyanearachchi et al. |
| 2001/0025265 A1 | 9/2001 | Takayasu |
| 2001/0027436 A1 | 10/2001 | Tenembaum |
| 2001/0029442 A1 | 10/2001 | Shiotsu et al. |
| 2001/0029455 A1 | 10/2001 | Chin et al. |
| 2001/0032164 A1 | 10/2001 | Kim |
| 2001/0032878 A1 | 10/2001 | Tsiounis et al. |
| 2001/0034694 A1 | 10/2001 | Elias |
| 2001/0039531 A1 | 11/2001 | Aoki |
| 2001/0047308 A1 | 11/2001 | Kaminsky et al. |
| 2001/0049628 A1 | 12/2001 | Icho |
| 2001/0049634 A1 | 12/2001 | Stewart |
| 2001/0049647 A1 | 12/2001 | Sheehan |
| 2002/0002538 A1 | 1/2002 | Ling |
| 2002/0013767 A1 | 1/2002 | Katz |
| 2002/0013774 A1 | 1/2002 | Morimoto |
| 2002/0026423 A1 | 2/2002 | Maritzen et al. |
| 2002/0029182 A1 | 3/2002 | Nakagawa |
| 2002/0029339 A1 | 3/2002 | Rowe |
| 2002/0035466 A1 | 3/2002 | Kodama |
| 2002/0038282 A1 | 3/2002 | Montgomery |
| 2002/0040344 A1 | 4/2002 | Preiser et al. |
| 2002/0042835 A1 | 4/2002 | Pepin et al. |
| 2002/0046137 A1 | 4/2002 | Odom et al. |
| 2002/0046157 A1 | 4/2002 | Solomon |
| 2002/0049664 A1 | 4/2002 | Hoffman et al. |
| 2002/0069049 A1 | 6/2002 | Turner |
| 2002/0069134 A1 | 6/2002 | Solomon |
| 2002/0069184 A1 | 6/2002 | Tilly et al. |
| 2002/0073015 A1 | 6/2002 | Chan et al. |
| 2002/0073111 A1 | 6/2002 | Heyliger |
| 2002/0082953 A1 | 6/2002 | Batham et al. |
| 2002/0082977 A1 | 6/2002 | Hammond et al. |
| 2002/0091580 A1 | 7/2002 | Wang |
| 2002/0099562 A1 | 7/2002 | Bruce et al. |
| 2002/0099656 A1 | 7/2002 | Poh Wong |
| 2002/0111889 A1 | 8/2002 | Buxton et al. |
| 2002/0111907 A1 | 8/2002 | Ling |
| 2002/0116318 A1 | 8/2002 | Thomas et al. |
| 2002/0120548 A1 | 8/2002 | Etkin |
| 2002/0120554 A1 | 8/2002 | Vega |
| 2002/0123959 A1 | 9/2002 | Mozley et al. |
| 2002/0143612 A1 | 10/2002 | Barik et al. |
| 2002/0147655 A1 | 10/2002 | Say |
| 2002/0174031 A1 | 11/2002 | Weiss |
| 2002/0174050 A1 | 11/2002 | Eynard et al. |
| 2002/0184610 A1 | 12/2002 | Chong et al. |
| 2002/0188670 A1 | 12/2002 | Stringham |
| 2002/0193986 A1 | 12/2002 | Schirris |
| 2002/0198713 A1 | 12/2002 | Franz et al. |
| 2003/0004809 A1 | 1/2003 | Palcic et al. |
| 2003/0005159 A1 | 1/2003 | Kumhyr |
| 2003/0014350 A1 | 1/2003 | Duell |
| 2003/0018885 A1 | 1/2003 | Landsman et al. |
| 2003/0022719 A1 | 1/2003 | Donald et al. |
| 2003/0033137 A1 | 2/2003 | Holubar et al. |
| 2003/0046059 A1 | 3/2003 | Litster et al. |
| 2003/0050861 A1 | 3/2003 | Martin |
| 2003/0055747 A1 | 3/2003 | Carr et al. |
| 2003/0074462 A1 | 4/2003 | Grove |
| 2003/0078033 A1 | 4/2003 | Sauer et al. |
| 2003/0083943 A1 | 5/2003 | Adams et al. |
| 2003/0083952 A1 | 5/2003 | Simpson et al. |
| 2003/0084051 A1 | 5/2003 | Depura et al. |
| 2003/0088566 A1 | 5/2003 | Wang |
| 2003/0093326 A1 | 5/2003 | Poon et al. |
| 2003/0105705 A1 | 6/2003 | Eyre |
| 2003/0110047 A1 | 6/2003 | Santosuosso |
| 2003/0139975 A1 | 7/2003 | Perkowski |
| 2003/0154134 A1 | 8/2003 | Wang |
| 2003/0167213 A1 | 9/2003 | Jammes et al. |
| 2003/0208352 A1 | 11/2003 | Lee |
| 2003/0229545 A1 | 12/2003 | Veres et al. |
| 2003/0229554 A1 | 12/2003 | Veres et al. |
| 2004/0001106 A1 | 1/2004 | Deutscher et al. |
| 2004/0039692 A1 | 2/2004 | Shields et al. |
| 2004/0049423 A1 | 3/2004 | Kawashima et al. |
| 2004/0073507 A1 | 4/2004 | Scott et al. |
| 2004/0078297 A1 | 4/2004 | Veres et al. |
| 2004/0204990 A1 | 10/2004 | Lee et al. |
| 2004/0204991 A1 | 10/2004 | Monahan et al. |
| 2004/0215467 A1 | 10/2004 | Coffman et al. |
| 2005/0021455 A1 | 1/2005 | Webster |
| 2005/0102151 A1 | 5/2005 | Fuwa et al. |
| 2005/0240392 A1 | 10/2005 | Munro et al. |
| 2006/0015452 A1 | 1/2006 | Kulasooriya et al. |
| 2006/0074792 A1 | 4/2006 | Wagoner et al. |

(56) References Cited

U.S. PATENT DOCUMENTS

| | | |
|---|---|---|
| 2006/0089897 A1 | 4/2006 | Maas et al. |
| 2006/0136301 A1 | 6/2006 | Grovit |
| 2006/0200353 A1 | 9/2006 | Bennett |
| 2006/0294005 A1 | 12/2006 | Drepak |
| 2007/0043648 A1* | 2/2007 | Chait .............................. 705/37 |
| 2007/0112643 A1 | 5/2007 | Veres et al. |
| 2007/0198391 A1 | 8/2007 | Dreyer et al. |
| 2007/0295903 A1 | 12/2007 | Schwartz |
| 2008/0147479 A1 | 6/2008 | Johnson |
| 2008/0152095 A1 | 6/2008 | Kleindienst et al. |
| 2010/0131510 A1 | 5/2010 | Boone et al. |
| 2010/0228536 A1 | 9/2010 | Grove |
| 2010/0312695 A1* | 12/2010 | Digrigoli et al. ............... 705/39 |
| 2011/0231530 A1 | 9/2011 | Veres et al. |
| 2011/0307384 A1* | 12/2011 | Digrigoli et al. ............... 705/44 |
| 2012/0047029 A1 | 2/2012 | Veres et al. |
| 2012/0246233 A1 | 9/2012 | Veres et al. |
| 2012/0284304 A1 | 11/2012 | Boone et al. |
| 2012/0303529 A1 | 11/2012 | Digrigoli et al. |
| 2013/0018738 A1 | 1/2013 | Faires et al. |
| 2013/0117093 A1 | 5/2013 | Oda et al. |
| 2013/0185186 A1* | 7/2013 | Blackwood ..................... 705/37 |
| 2014/0236815 A1 | 8/2014 | Digrigoli et al. |

FOREIGN PATENT DOCUMENTS

| | | |
|---|---|---|
| CN | 102129642 | 7/2011 |
| DE | 4308597 A1 | 8/1993 |
| EP | 0044226 A1 | 1/1982 |
| EP | 0251619 A2 | 1/1988 |
| EP | 0254812 A2 | 2/1988 |
| EP | 0273099 A1 | 7/1988 |
| EP | 0520695 A2 | 12/1992 |
| EP | 0542298 A2 | 5/1993 |
| EP | 0590861 A2 | 4/1994 |
| FR | 2658635 A1 | 8/1991 |
| GB | 1341693 A | 12/1973 |
| GB | 1380420 A | 1/1975 |
| GB | 2261579 A | 5/1993 |
| GB | 2296413 A | 6/1996 |
| GB | 2301919 A | 12/1996 |
| JP | 2000322490 | 11/2000 |
| JP | 2001000469 A | 1/2001 |
| JP | 2001319098 A | 11/2001 |
| JP | 2001338179 A | 12/2001 |
| JP | 2001357248 A | 12/2001 |
| JP | 2002092390 A | 3/2002 |
| JP | 2002109286 A | 4/2002 |
| JP | 2002207898 A | 7/2002 |
| JP | 2004094643 | 3/2004 |
| KR | 20000018041 | 4/2000 |
| KR | 20000024372 | 5/2000 |
| KR | 20000037395 | 7/2000 |
| KR | 20000049744 | 8/2000 |
| KR | 20020059971 | 7/2002 |
| NL | 9300266 A | 9/1994 |
| WO | WO-8809350 A | 12/1988 |
| WO | WO-9116691 A1 | 10/1991 |
| WO | WO-9215174 A1 | 9/1992 |
| WO | WO-9512169 A1 | 5/1995 |
| WO | WO-9517711 A1 | 6/1995 |
| WO | WO-9633568 A1 | 10/1996 |
| WO | WO-9634356 A1 | 10/1996 |
| WO | WO-9636024 A1 | 11/1996 |
| WO | WO-9641315 A1 | 12/1996 |
| WO | WO-9704411 A1 | 2/1997 |
| WO | WO-9737315 A1 | 10/1997 |
| WO | WO-9743727 A1 | 11/1997 |
| WO | WO-9748078 A2 | 12/1997 |
| WO | WO-9809447 A2 | 3/1998 |
| WO | WO-9809447 A3 | 3/1998 |
| WO | WO-9960503 A1 | 11/1999 |
| WO | WO-9963461 A1 | 12/1999 |
| WO | WO-0058862 A2 | 10/2000 |
| WO | WO-0062231 A1 | 10/2000 |
| WO | WO-00079461 A1 | 12/2000 |
| WO | WO 0102926 | 1/2001 |
| WO | WO-0116815 A2 | 3/2001 |
| WO | WO-0129750 A1 | 4/2001 |
| WO | WO 0137171 | 5/2001 |
| WO | WO-0139059 A1 | 5/2001 |
| WO | WO-0152135 A1 | 7/2001 |
| WO | WO-0153929 A1 | 7/2001 |
| WO | WO 0157722 | 8/2001 |
| WO | WO-0171579 A1 | 9/2001 |
| WO | WO-0171580 A1 | 9/2001 |
| WO | WO-0173665 A1 | 10/2001 |
| WO | WO-0180111 A1 | 10/2001 |
| WO | WO-0182115 A1 | 11/2001 |
| WO | WO-0205179 A1 | 1/2002 |
| WO | WO-0231737 A1 | 4/2002 |
| WO | WO-0233618 A1 | 4/2002 |
| WO | WO-0248828 A2 | 6/2002 |
| WO | WO-02069101 A2 | 9/2002 |
| WO | WO-02097582 A2 | 12/2002 |
| WO | WO-03038560 A2 | 5/2003 |
| WO | WO 3104931 | 12/2003 |
| WO | WO-2004090666 A2 | 10/2004 |
| WO | WO-2004090666 A3 | 10/2004 |

OTHER PUBLICATIONS

"U.S. Appl. No. 09/905,525, Final Office Action dated Jan. 10, 2008", 15 pgs.

"U.S. Appl. No. 09/905,525, Final Office Action dated Jun. 29, 2006", 14 pgs.

"U.S. Appl. No. 09/905,525, Non Final Office Action dated Jun. 25, 2007", 16 pgs.

"U.S. Appl. No. 09/905,525, Non Final Office Action dated Dec. 12, 2005", 12 pgs.

"U.S. Appl. No. 09/905,525, Non Final Office Action dated Dec. 14, 2004", 11 pgs.

"U.S. Appl. No. 09/905,525, Non Final Office Action dated Dec. 18, 2006", 15 pgs.

"U.S. Appl. No. 09/905,525, Non-Final Office Action dated Mar. 5, 2009", 25 pgs.

"U.S. Appl. No. 09/905,525, Non-Final Office Action dated Aug. 22, 2008", 17 pgs.

"U.S. Appl. No. 09/905,525, Notice of Allowance dated Sep. 18, 2009", 12 pgs.

"U.S. Appl. No. 09/905,525, Response filed Mar. 19, 2007 to Non Final Office Action dated Dec. 18, 2006", 9 pgs.

"U.S. Appl. No. 09/905,525, Response filed Mar. 27, 2008 to Non Final Office Action dated Jan. 10, 2008", 17 pgs.

"U.S. Appl. No. 09/905,525, Response filed Apr. 12, 2006 to Non Final Office Action dated Dec. 12, 2005", 8 pgs.

"U.S. Appl. No. 09/905,525, Response filed Apr. 13, 2005 to Non Final Office Action dated Dec. 14, 2004", 17 pgs.

"U.S. Appl. No. 09/905,525, Response filed Jun. 5, 2009 to Non Final Office Action dated Mar. 5, 2009", 19 pgs.

"U.S. Appl. No. 09/905,525, Response filed Jun. 10, 2008 to Advisory Action dated May 2, 2008", 20 pgs.

"U.S. Appl. No. 09/905,525, Response filed Sep. 22, 2007 to Final Office Action dated Jun. 25, 2007", 19 pgs.

"U.S. Appl. No. 09/905,525, Response filed Sep. 25, 2007 to Non Final Office Action dated Jun. 25, 2007", 17 pgs.

"U.S. Appl. No. 09/905,525, Response filed Nov. 24, 2008 to Non Final Office Action dated Aug. 22, 2008", 17 pgs.

"U.S. Appl. No. 10/407,756, Advisory Action dated Apr. 3, 2009", 3 pgs.

"U.S. Appl. No. 10/407,756, Appeal Brief filed Jul. 27, 2010", 27 pgs.

"U.S. Appl. No. 10/407,756, Appeal Decision dated May 31, 2013", 10 pgs.

"U.S. Appl. No. 10/407,756, Decision on Pre-Appeal Brief Request dated May 27, 2010", 2 pgs.

"U.S. Appl. No. 10/407,756, Final Office Action dated Jan. 7, 2009", 28 pgs.

(56) References Cited

OTHER PUBLICATIONS

"U.S. Appl. No. 10/407,756, Final Office Action dated Jan. 15, 2010", 16 pgs.
"U.S. Appl. No. 10/407,756, Non Final Office Action dated Aug. 6, 2009", 14 pgs.
"U.S. Appl. No. 10/407,756, Non-Final Office Action dated Jun. 27, 2008", 10 pgs.
"U.S. Appl. No. 10/407,756, Pre-Appeal Brief Request filed Apr. 15, 2010", 5 pgs.
"U.S. Appl. No. 10/407,756, Preliminary Amendment filed Nov. 3, 2003", 12 pgs.
"U.S. Appl. No. 10/407,756, Reply Brief filed Dec. 28, 2010", 3 pgs.
"U.S. Appl. No. 10/407,756, Response filed Mar. 6, 2009 to Final Office Action dated Jan. 7, 2009", 14 pgs.
"U.S. Appl. No. 10/407,756, Response filed May 7, 2009 to Advisory Action dated Apr. 3, 2009", 14 pgs.
"U.S. Appl. No. 10/407,756, Response filed Sep. 26, 2008 to Non-Final Office Action dated Jun. 27, 2008", 17 pgs.
"U.S. Appl. No. 10/407,756, Response filed Nov. 6, 2009 to Non Final Office Action dated Aug. 6, 2009", 14 pgs.
"U.S. Appl. No. 10/607,587, Advisory Action dated Jul. 2, 2008", 2 pgs.
"U.S. Appl. No. 10/607,587, Advisory Action dated Sep. 11, 2009", 2 pgs.
"U.S. Appl. No. 10/607,587, Appeal Brief filed Dec. 9, 2009", 27 pgs.
"U.S. Appl. No. 10/607,587, Decision on Appeals dated Jan. 11, 2012", 10 pgs.
"U.S. Appl. No. 10/607,587, Examiners Answer received Feb. 4, 2010 to Appeal Brief filed Dec. 9, 2009", 29 pgs.
"U.S. Appl. No. 10/607,587, Final Office Action dated Apr. 21, 2008", 28 pgs.
"U.S. Appl. No. 10/607,587, Final Office Action dated Jun. 23, 2009", 11 pgs.
"U.S. Appl. No. 10/607,587, Final Office Action dated Oct. 25, 2012", 28 pgs.
"U.S. Appl. No. 10/607,587, Non Final Office Action dated Apr. 16, 2012", 22 pgs.
"U.S. Appl. No. 10/607,587, Non-Final Office Action dated Nov. 30, 2007", 19 pgs.
"U.S. Appl. No. 10/607,587, Non-Final Office Action dated Dec. 19, 2008", 31 pgs.
"U.S. Appl. No. 10/607,587, Pre-Appeal Brief Request filed Sep. 23, 2009", 5 pgs.
"U.S. Appl. No. 10/607,587, Response filed Feb. 28, 2008 to Non-Final Office Action dated Nov. 30, 2007", 15 pgs.
"U.S. Appl. No. 10/607,587, Response filed Mar. 12, 2012 to Decision on Appeal dated Jan. 11, 2012 and to Final Office Action dated Jun. 23, 2009", 11 pgs.
"U.S. Appl. No. 10/607,587, Response filed Mar. 19, 2009 to Non Final Office Action dated Dec. 19, 2008", 12 pgs.
"U.S. Appl. No. 10/607,587, Response filed Jun. 19, 2008 to Final Office Action dated Apr. 21, 2008", 17 pgs.
"U.S. Appl. No. 10/607,587, Response filed Aug. 15, 2012 to Non Final Office Action dated Apr. 16, 2012", 12 pgs.
"U.S. Appl. No. 10/607,587, Response filed Aug. 21, 2009 to Final Office Action dated Jun. 23, 2009", 13 pgs.
"U.S. Appl. No. 10/607,587, Response filed Oct. 16, 2008 to Final Office Action dated Apr. 21, 2008", 15 pgs.
"U.S. Appl. No. 10/608,525, Advisory Action dated Sep. 8, 2009", 3 pgs.
"U.S. Appl. No. 10/608,525, Advisory Action dated Jul. 27, 2008", 3 pgs.
"U.S. Appl. No. 10/608,525, Decision on Pre-Appeal Brief Request dated Sep. 12, 2008", 2 pgs.
"U.S. Appl. No. 10/608,525, Decision on Pre-Appeal Brief Request dated Nov. 17, 2009", 2 pgs.
"U.S. Appl. No. 10/608,525, Final Office Action dated May 1, 2008", 8 pgs.

"U.S. Appl. No. 10/608,525, Final Office Action dated Jun. 26, 2009", 11 pgs.
"U.S. Appl. No. 10/608,525, Non-Final Office Action dated Sep. 11, 2007", 6 pgs.
"U.S. Appl. No. 10/608,525, Non-Final Office Action dated Dec. 16, 2008", 14 pgs.
"U.S. Appl. No. 10/608,525, Notice of Allowance dated Feb. 8, 2010", 6 pgs.
"U.S. Appl. No. 10/608,525, Pre-Appeal Brief Request filed Sep. 28, 2009", 5 pgs.
"U.S. Appl. No. 10/608,525, Pre-Appeal Brief Request dated Jul. 31, 2008", 2 pgs.
"U.S. Appl. No. 10/608,525, Response filed Jan. 11, 2008 to Non-Final Office Action dated Sep. 11, 2007", 15 pgs.
"U.S. Appl. No. 10/608,525, Response filed Mar. 16, 2009 to Non-Final Office Action dated Dec. 16, 2008", 15 pgs.
"U.S. Appl. No. 10/608,525, Response filed Jul. 1, 2008 to Final Office Action dated May 1, 2008", 15 pgs.
"U.S. Appl. No. 10/608,525, Response filed Aug. 21, 2009 to Final Office Action dated Jun. 26, 2009", 16 pgs.
"U.S. Appl. No. 10/608,525, Response filed Oct. 16, 2008 to Final Office Action dated May 1, 2008", 17 pgs.
"U.S. Appl. No. 11/641,262, Advisory Action dated Aug. 13, 2012", 3 pgs.
"U.S. Appl. No. 11/641,262, Advisory Action dated Oct. 21, 2010", 3 pgs.
"U.S. Appl. No. 11/641,262, Appeal Brief filed Jan. 3, 2013", 30 pgs.
"U.S. Appl. No. 11/641,262, Decision from Pre-Appeal Brief dated Oct. 3, 2012", 2 pgs.
"U.S. Appl. No. 11/641,262, Decision on Pre-Appeal Brief Request dated Dec. 6, 2010", 2 pgs.
"U.S. Appl. No. 11/641,262, Examiner's Answer dated May 10, 2013", 10 pgs.
"U.S. Appl. No. 11/641,262, Final Office Action dated May 23, 2012", 9 pgs.
"U.S. Appl. No. 11/641,262, Final Office Action dated Aug. 5, 2010", 12 pgs.
"U.S. Appl. No. 11/641,262, Non Final Office Action dated Nov. 2, 2011", 9 pgs.
"U.S. Appl. No. 11/641,262, Non-Final Office Action dated Mar. 11, 2010", 16 pgs.
"U.S. Appl. No. 11/641,262, Pre-Appeal Brief Request filed Nov. 5, 2010", 5 pgs.
"U.S. Appl. No. 11/641,262, Pre-Appeal Brief Request for Review filed Aug. 23, 2012", 5 pgs.
"U.S. Appl. No. 11/641,262, Reply Brief filed Jul. 10, 2013 in Response to Examiner's Answer dated May 10, 2013", 8 pgs.
"U.S. Appl. No. 11/641,262, Response filed Feb. 2, 2012 to Non Final Office Action dated Nov. 2, 2011", 19 pgs.
"U.S. Appl. No. 11/641,262, Response filed Jun. 11, 2010 to Non Final Office Action dated Mar. 11, 2010", 18 pgs.
"U.S. Appl. No. 11/641,262, Response filed Jul. 23, 2012 to Final Office Action dated Mar. 23, 2012", 16 pgs.
"U.S. Appl. No. 11/641,262, Response filed Oct. 5, 2010 to Final Office Action dated Aug. 5, 2010", 15 pgs.
"U.S. Appl. No. 12/693,275, Non Final Office Action dated Dec. 30, 2011", 6 pgs.
"U.S. Appl. No. 12/693,275, Notice of Allowance dated May 8, 2012", 11 pgs.
"U.S. Appl. No. 12/693,275, Response filed Mar. 19, 2012 to Non Final Office Action dated Dec. 30, 2011", 13 pgs.
"U.S. Appl. No. 12/818,935, Non Final Office Action dated Nov. 23, 2010", 6 pgs.
"U.S. Appl. No. 12/818,935, Notice of Allowance dated May 5, 2011", 7 pgs.
"U.S. Appl. No. 12/818,935, Notice of Allowance dated Aug. 5, 2011", 7 pgs.
"U.S. Appl. No. 12/818,935, Response filed Feb. 17, 2010 to Non-Final Office Action dated Nov. 23, 2010", 7 pgs.
"U.S. Appl. No. 13/212,994, Non Final Office Action dated Dec. 12, 2011", (Dec. 15, 2011), 7 pgs.

(56) References Cited

OTHER PUBLICATIONS

"U.S. Appl. No. 13/212,994, Notice of Allowance dated May 7, 2012", 8 pgs.
"U.S. Appl. No. 13/212,994, Preliminary Amendment Filed Oct. 4, 2011", 3 pgs.
"U.S. Appl. No. 13/212,994, Response filed Mar. 8, 2012 to Non Final Office Action dated Dec. 12, 2011", 7 pgs.
"U.S. Appl. No. 13/550,233, Final Office Action dated Oct. 30, 2013", 7 pgs.
"U.S. Appl. No. 13/550,233, Non Final Office Action dated Mar. 26, 2013", 12 pgs.
"U.S. Appl. No. 13/550,233, Notice of Allowance dated Jan. 8, 2014", 11 pgs.
"U.S. Appl. No. 13/550,233, Response filed Jun. 24, 2013 to Non Final Office Action dated Mar. 26, 2013", 14 pgs.
"U.S. Appl. No. 13/550,233, Response filed Dec. 20, 2013 to Final Office Action dated Oct. 30, 2013", 9 pgs.
"U.S. Appl. No. 13/565,606, Final Office Action dated Jun. 7, 2013", 11 pgs.
"U.S. Appl. No. 13/565,606, Non Final Office Action dated Jan. 16, 2014", 9 pgs.
"U.S. Appl. No. 13/565,606, Non Final Office Action dated Feb. 19, 2013", 9 pgs.
"U.S. Appl. No. 13/565,606, Response filed Apr. 3, 2014 to Non Final Office Action dated Jan. 16, 2014", 11 pgs.
"U.S. Appl. No. 13/565,606, Response filed May 17, 2013 to Non Final Office Action dated Feb. 19, 2013", 10 pgs.
"U.S. Appl. No. 13/565,606, Response filed Sep. 6, 2013 to Final Office Action dated Jun. 7, 2013", 10 pgs.
"U.S. Appl. No. 13/567,902, Final Office Action dated May 22, 2013", 9 pgs.
"U.S. Appl. No. 13/567,902, Non Final Office Action dated Dec. 20, 2012", 8 pgs.
"U.S. Appl. No. 13/567,902, Notice of Allowance dated Dec. 10, 2013", 15 pgs.
"U.S. Appl. No. 13/567,902, Response filed Mar. 20, 2013 to Non Final Office Action dated Dec. 20, 2012", 9 pgs.
"U.S. Appl. No. 13/567,902, Response filed Aug. 12, 2013 to Final Office Action dated May 22, 2013", 12 pgs.
"U.S. Appl. No. 14/231,613, Preliminary Amendment dated Apr. 14, 2014", 8 pgs.
"U.S. Appl. No. 14/231,624, Preliminary Amendment filed Apr. 14, 2014", 9 pgs.
"U.S. Appl. No. 14/231,633, Preliminary Amendment dated Apr. 14, 2014", 8 pgs.
"U.S. Appl. No. 14/231,639, Preliminary Amendment dated Apr. 11, 2014", 8 pgs.
"U.S. Appl. No. 14/231,650, Preliminary Amendment filed Apr. 9, 2014", 8 pgs.
"U.S. Appl. No. 14/231,684, Preliminary Amendment filed Apr. 9, 2014", 8 pgs.
"U.S. Appl. No. 14/231,696, Preliminary Amendment filed Apr. 9, 2014", 8 pgs.
"U.S. Appl. No. 14/231,706, Preliminary Amendment filed Apr. 9, 2014", 8 pgs.
"U.S. Appl. No. 14/231,719, Preliminary Amendment filed Apr. 9, 2014", 8 pgs.
"U.S. Appl. No. 14/231,722, Preliminary Amendment filed Apr. 9, 2014", 8 pgs.
"BarterBee.com: Buy, Sell, Why Points?", [Online]. Retrieved from the Internet: <URL: http://www.barterbee.com/xmain0003/?_hp=trade>, (Accessed Aug. 14, 2006), 1 pg.
"BarterBee.com: Help & FAQ", [Online]. Retrieved from the Internet: <URL: http://www.barterbee.com/xmain0005/?_hp=faq_4_requesting>, (Accessed Aug. 14, 2006), 2 pgs.
"BarterBee.com: Points Q & A", [Online]. Retrieved from the Internet: <URL: http://www.barterbee.com/xmain0003/?_hp=point>, (Accessed Aug. 14, 2006), 1 pg.

"Chinese Application Serial No. 200480015567.0, Final Office Action dated Jan. 19, 2011", with English translation of claims, 14 pgs.
"Chinese Application Serial No. 200480015567.0, Office Action dated Feb. 12, 2010", with English translation of claims, 18 pgs.
"Chinese Application Serial No. 200480015567.0, Office Action dated Sep. 8, 2010", with English translation of claims, 12 pgs.
"Chinese Application Serial No. 200480015567.0, Response filed Jun. 28, 2010 to Office Action dated Feb. 12, 2010", with English translation of claims, 16 pgs.
"Chinese Application Serial No. 200480015567.0, Response filed Dec. 23, 2010 to Non Final Office Action dated Sep. 8, 2010", with English translation of claims, 15 pgs.
"Ebay—Your Personal Trading Community", [Online]. Retrieved from the Internet: <URL: http://web.archive.org/web/19991007062815/www.ebay.com>, (Oct. 1999), 23 pgs.
"European Application Serial No. 01959319.3, Office Action dated May 15, 2007", 3 pgs.
"European Application Serial No. 01959319.3, Response filed Nov. 23, 2007 to Office Action dated May 15, 2007", 23 pgs.
"European Application Serial No. 01959319.3, Summons to Attend Oral Proceedings dated Jul. 13, 2012", 3 pgs.
"International Application Serial No. PCT/US01/23854, International Preliminary Examination Report dated Aug. 19, 2002", 3 pgs.
"International Application Serial No. PCT/US01/23854, International Search Report dated Dec. 28, 2001", 3 pgs.
"International Application Serial No. PCT/US04/10084, International Search Report and Written Opinion dated Mar. 17, 2005", 18 pgs.
"International Application Serial No. PCT/US2004/010084, International Search Report dated Dec. 10, 2004", 3 pgs.
"International Application Serial No. PCT/US2004/010084, Written Opinion dated Dec. 10, 2004", 4 pgs.
"International Application Serial No. PCT/US2004/010084, International Preliminary Report on Patentability dated Jan. 23, 2006", 5 pgs.
"New eBay-like auction software released", Business Wire, Business Editors/High-Tech Writers; Business Wire; New York, (Mar. 17, 1999), 2 pgs.
"OED Online Main entry text Frame", [Online]. <URL: http://dictionary.oed.com/cgi/entry_main/50218727?query_type=word&queryword=select&first=1&max_to show+10&sort at Http://dictionary.oed.com/cgi/entry_main/50218727?query_type=word&queryword=approve&first=1&max_to show+10&sort>, (Accessed Apr. 14, 2008), 8 pgs.
"Peerflix: How it Works", Copyright © 2004-2006 Peerflix, Inc., [Online]. Retrieved from the Internet: <URL: http://www.peerflix.com/Default.aspx?tabid=64>, (Accessed Aug. 14, 2006), 2 pgs.
"Peerflix: Netflix, Blockbuster and Peerflix: Compare Online DVD Rentals vs. Buying vs. Trading", Copyright © 2004-2006 Peerflix, Inc., [Online]. Retrieved from the Internet: <URL: http://www.peerflix.com/Default.aspx?tabid=171>, (Accessed Aug. 14, 2006), 2 pgs.
"PSINet Teams with WorldPay Ltd. To Launch the World's First Secure Multi-Currency Solution for International Electronic Commerce", PR Newswire Association, (Oct. 6, 1997), 3 pgs.
"RSA signs deal with China", Internet Week, 2(7), (Feb. 12, 1996), 2 pgs.
"Yahoo Homepage", Internet Archive Wayback Machine, http://web.archive.org/web/19991003015603/http://www.yahoo.com/index.html, (Oct. 3, 1999), 1 p.
"Yahoo!—Regional:Countries:Afghanistan", Copyright © 1994-97 Yahoo! Inc., [Online]. Retrieved from the Internet: <URL: http://web.archive.org/web/20060921181441/http://dir.yahoo.com/Regional/countries/afghanistan>, (Jun. 16, 1997), 1 pg.
"Yahoo!—Regional:Countries:Sweden", Copyright © 1994-97 Yahoo! Inc., [Online]. Retrieved from the Internet: <URL: http://web.archive.org/web/19970616194441/www.yahoo.com/Regional/Countries/Sweden/>, (Jun. 16, 1997), 2 pgs.
"Yahoo! Auctions Celebrates One-Year Anniversary; As Online Auction Usage Continues to Grow, Yahoo! Is Quickly Becoming the World Marketplace of the New Millennium", Business Wire, (Sep. 14, 1999), 3 pages.

(56) References Cited

OTHER PUBLICATIONS

Akin, David, "Web retailing gains market muscle as concerns fade: Record season: Increasing number of sites catering for Canadian dollars", Financial Post, p04, XP002905105, (Dec. 26, 1998), 3 pages.

Asbrand, Deborah, "Taking Stock in Trading Exchanges", [Online]. Retrieved from the Internet: <URL: http://www.reed-electronics.com/eb-mag/index.asp?layout=articlePrint&articleID=CA42124>, (Apr. 1, 2000), 5 pgs.

Baumann, G. W, "Personal Optimized Decision/Transaction Program", IBM Technical Disclosure Bulletin, (Jan. 1995), 83-84.

Bers, Joanna Smith, "Cyberspace: The new promised land", Bank Systems & Technology, 32(7), (Jul. 1995), 32-37.

Bidnbuy, "Going, going, virtually gone . . . ", Business and Finance Dialog File 20#06012646, (Jun. 17, 1999), 3 pgs.

Business Wire, "Subasta.com Enters Into Strategic Partnership with From2.com", Business Wire, Obtained from Proquest, Document No. 43206061, (Jul. 16, 1999), 2 pages.

Business Wire, "Yahoo! Launches Three New European Auctions Services; Yahoo! Italy, Yahoo! Spain and Yahoo! Sweden Unveil New Local Auctions", Business Wire, Obtained from Proquest, Document No. 45061209, (Sep. 23, 1999), 3 pages.

Chan, H. C., et al., "Design and implementation of a mobile agent-based auction system", Communications, Computers and signal Processing, 2001. PACRIM. 2001 IEEE Pacific Rim Conference, vol. 2, (Aug. 26-28, 2001), 740-743.

Chapman, Robert L, et al., "Roget's International thesaurus fourth edition", sec 637, Thomas Y Crowell, Publishers New York, (1977), 3 pgs.

Chen, Jian, "Bidders strategy under group-buying auction on the Internet", Systems, Man and Cybernetics, Part A, IEEE Transactions on, vol. 32 Issue: 6, (Nov. 2002), 680-690.

Clemons, E., "Evaluating the prospects for alternative electronic securities", Proceedings of ICIS 91: 12th International Conference on Information Systems, (Dec. 16-18, 1991), 53-63.

Cohen, Jackie, "Citibank's Bid to Be the King of Cash (Citibank unveils Electronic Monetary System prototype, a digital currency system capable of replacing all current monetary systems)", Bank Technology News, 9(9), (Sep. 1996), p. 9+.

Cooper, C., et al., "Playing Catch-Up: U.S. Web Firms Get Slow Start in Europe, Amid Crowded Field—Used to Being First and Best at Home, They Stumble in World's No. 2 Market—Pouncing on Amazon Delays", Wall Street Journal Europe, Obtained from Proquest, Document No. 46338867, (Nov. 15, 1999), 5 pages.

Creed, Adam, "Haggling Online in the Philippines—Magtawaran Auction site—Company Business and Marketing—Brief Article", Newsbytes News Network, http://www.findarticles.com/p/articles/mi_mONEW/is_2000_May_1/ai_61859593, (May 1, 2000), Web Page.

Dalton, Gary, "Going, Going, Gone!—E-commerce is leading to an anything-goes environment of online bidding and dynamic pricing", Information Week, http://www.informationweek.com/755/auction.htm, (Oct. 4, 1999), 4 pages.

Davidow, Emily, "The dynamics of pricing", Home Textiles Today, (Feb. 2000), p. 42.

Edwards, Mark, "Your Web Browser is Bugged", Windows IT Pro, http://www.windowsitpro.com/WindowsSecurity/Article/ArticleID/9543/WindowsSecurity_9543.html, (Jul. 13, 2000), 3 pages.

Edwards, Morris, "New B2B player spreads benefits of e-commerce", Communications News, (Jan. 2001), 4 pages.

Fisher, Dennis, "More Goods on the Block", EWeek, (Dec. 2000), 4 pages.

Franse, Karen, "Distribution Briefs—Are Auctions in Vogue?", VARBusiness, http://www.varbusiness.com/sections/strategy/strategy.jhtml?articleId=18828086, (Mar. 11, 2002), 2 pgs.

Goldsborough, Reid, "Internet Auctions Examined", Link-Up, 17, (Nov./Dec. 2000), p. 24.

Goldstein, D E, "Medical E-procurement-navigating in a B2B Market", Health Management Technology, 21(8), (Aug. 2000), 30-6.

Graham, Ian, "The Emergence of Linked Fish Markets in Europe", Electronic Markets. vol. 8, No. 2, (1998), 29-32.

Greengard, Samuel, "What Traffic Will Bear", http://www.businessfinancemag.com/magazine/archives/article.html?articleID=13725 BusinessFinanceMag.com, (Mar. 2001), 4 pages.

Gupta, Pankaj, "Most Flexible FF?", Google Groups, (Oct. 29, 1996), 2 pages.

Hess, C. M, et al., "Computerized Loan Organization System: An Industry Case Study of the Electronic Markets Hypothesis", MIS Quarterly, vol. 18(3), (Sep. 1994), 251-275.

Jaroneczyk, Jennifer, "Sold on an Old Idea", Internet World Magazine, (Feb. 15, 2001), 3 pages.

Kalin, Sari, "Mar. 2001", Darwin Magazine, http://www.darwinmag.com/read/040101/low.html, (Apr. 2001), 5 pages.

Klein, Stefan, "Introduction to Electronic Auctions", Focus Theme, vol. 7, No. 4, (1997), 3-6.

Kumar, Manoj, et al., "Sales Promotions on the Internet", Proceedings of the Usenix Conference on E-commerce, (1998), 1-11.

Lassila, Ora, "Web metadata; A Matter of Semantics", IEEE Internet Computing, v2i4pg30 Proquest #1424143061, (1998), 15 pgs.

Lee, H. G, "Electronic brokerage and electronic auction: the impact of IT on market structures", Proceedings of the Twenty-Ninth Hawaii International Conference on System Sciences, vol. 4, (1996), 397-406.

Lee, Ho Geun, "AUCNET: Electronic Intermediary for Used-Car Transactions", Focus Theme, Electronic Markets, vol. 7, No. 4, (1997), 24-28.

Lee, Pui-Mun, et al., "Considering exchange rate movements in economic evaluation of foreign direct investments", Engineering Economist, 40(2), (Winter, 1995), 171-199.

Lindsay, Jeff, et al., "The Historic Use of Computerized Tools for Marketing and Market Research: A Brief Survey", Published as Document 6359D at IP.com, (Dec. 27, 2001), 20 pages.

M2 Presswire, "HP completes online strategy with launch of e-commerce site", Proquest#43225990, (Jun. 29, 1999), 3 pgs.

M2 Presswire, "United Technologies: UTC's Carrier Corp. teams with FreeMarkets to create largest Asian-based B2B online auction market to date; UTC Division identifies average annual savings of more than 16 percent on electric motors through FreeMarkets B2B eMarketpla", M2 Presswire, (Mar. 22, 2000), 2 pages.

Malone, T., et al., "Electronic Markets and Electronic Hierarchies", Communications of the ACM, vol. 30, No. 6, (Jun. 1987), 484-497.

Mardesich, Jodi, "Site Offers Clearance for End-of-Life Products—Onsale Takes Auction Gavel Electronic", Computer Reseller News, (Jul. 8, 1996), 2 pps.

Massimb, Marcel, "Electronic Trading, Market Structure and Liquidity", Financial Analysts Journal, 50(1), (Jan./Feb. 1994), 39-50.

Mcclenahen, John, "Net Gains", Industry Week, Cleveland. vol. 248, Iss. 10, [Online]. Retrieved from the Internet: <URL: http://proquest.umi.com/pqdweb?index=O&did=41808971&SrchMode=l&sid=5&Fmt=4& V . . . >, (May 17, 1999), p. 51.

Mcdougall, Bruce, "Electronic evolution", Canadian Banker, 102(5), (Sep.-Oct. 1995), p. 28(6).

Mckendrick, Joseph, "Old Economy Players Step Up", EC World, (Nov. 2000), 35-44.

Meade, J., "Visual 360: A Performance Appraisal System That's 'Fun'", HR Magazine, Society for Human Resource Management., (Jul. 1999), 3 pgs.

Merlino, Laurel, "Auction Anxiety", Upside Today, (Oct. 2000), 247-251.

Mitchell, Lori, "BayBuilder delivers easy, profitable reverse auctions", Infoworld, http://www.infoworld.com/articles/eu/xml/00/06/05/000605eubaybuilder.html, (Jun. 2, 2000), 6 pages.

Mollison, Caitlin, "America West Airlines opt for reverse auctions", Internet World, 8(4), (Apr. 1, 2002), 42(3).

Mollman, Steve, "Are you ready to bicker over the price of that sandwich? In the new economy you won't pay retail for anything.", PC/Computing, (Jan. 1, 2000), 8-10.

(56) References Cited

OTHER PUBLICATIONS

Morgan, Lisa, "Pick Your Lot: Build consumer-oriented auctions with AuctionBuilder", Internet Week, (Sep. 18, 2000), 4 pages.
Neo, B. S, "The implementation of an electronic market for pig trading in Singapore", Journal of Strategic Information Systems; vol. 1(5), (Dec. 1992), 278-288.
Ohlson, Kathleen, "Looking behind, beyond B2B marketplace woes", Network World Fusion, http://www.nwfusion.com/archive/2001/119669_06-11-2001.html, (Jun. 11, 2001), 4 pages.
Patel, Jeetu, et al., "New Platform Options Fuel E-Commerce", Information Week,, http://www.informationweek.com/779/ecommerce.htm, (Mar. 27, 2000), 3 Pages.
Piccinelli, G, et al., "e-service composition: supporting dynamic definition of process-oriented negotiation parameters", 12th International Workshop on Database and Expert Systems Applications, 2001. Proceedings., (Sep. 3-7 , 2001), 727-731.
Pollick, M., "Sold! on eBay: As antique and collectible dealers see their sales increase through online auctions such as eBay, more of them are deciding that the internet is not something to be afraid of", Sarasota Herald Tribune, Obtained from Proquest, Document No. 45499060, (Oct. 11, 1999), 8 pages.
Post, D. L, et al., "Application of auctions as a pricing mechanism for the interchange of electric power", IEEE Transactions on Power Systems, 10(3), (Aug. 1995), 1580-1584.
PR Newswire Europe Ltd., "Mitsubishi Venture, Wells Fargo Partner to Offer Multi-Currency E-Commerce Storefront", PR Newswire, Obtained from Proquest, Document No. 39345965, (Mar. 1, 1999), 3 pages.
Preist, Chris, et al., "Adaptive Agents in a Persistent Shout Double Auction", International Conference on Information and Computation Economies, Proceedings of the first international conference on Information and computation economies, (1998), 11-18.
Pressler, Margaret, "Sells on eBay; Housewife finds herself head of multinational software firm", Washington Post, Proquest # 44484325, (Sep. 5, 1999), 3 pgs.
Queree, Anne, "Bid it Out", Global Finance, (Jan. 2000), 36-37.
Reck, Martin, "Trading-Process Characteristics of Electronic Auctions", Focus Theme, vol. 7, No. 4, (1997), 17-23.
Resnick, Paul, "Reputation systems", Communications of the ACM, 43(12), (Dec. 2000), 45-48.
Rockoff, T. E, et al., "Design of an Internet-based system for remote Dutch auctions", Internet Research: Electronic Networking Applications and Policy, vol. 5(4), (Jan. 1, 1995), 10-16.
Schmid, B. F, "The Development of Electronic Commerce", EM—Electronic Markets, No. 910, (Oct. 1993), 2 pgs.
Siegmann, Ken, "Nowhere to go but up", PC Week; vol. 12(42), Ziff-Davis Publishing Company, (Oct. 23, 1995), 1-3.
Strassmann, Paul, "The Impact of B2B", Computerworld, (Oct. 2, 2000), 3 pages.
Tapscott, D., "eBay endagners traditional papers auctioneer can pack far more punch in your sales pitch", National Post, Proquest# 54945579, (Oct. 9, 1999), 3 pgs.
Tjostheim, Ingvar, et al., "A case study of an on-line auction for the World Wide Web", Norwegian Computing Center (NR), [Online]. Retrieved from the Internet: <URL: http://www.nr.no/~ingvar/enter98.html>, (Accessed Feb. 21, 2005), 1-10.
Turban, Efraim, "Auctions and Bidding on the Internet: An Assessment", Focus Theme, EM—Electronic Markets, vol. 7, No. 4, (1997), 7-11.
Turek, Norbert, "Online Portals Offer Bandwidth and Voice Services", Information Week, http://www.informationweek.com/784/bandwidth.htm, (May 1, 2000), 4 pages.
Van Heck, E., et al., "Experiences with Electronic Auctions in the Dutch Flower Industry", Focus Theme, Erasmus University, The Netherlands, (1996), 6 pgs.
Warbelow, A, et al., "Aucnet: TV Auction Network System", Harvard Business School Case/Study, HBVR#9-190-001, USA, (Jul. 1989), 1-16.
Weiss, Scott, "Pan-Am FF Program", Google Groups, (Oct. 16, 1996), 3 pages.
Wilson, D., "Going . . . Going . . . Gone!Bargain-hunters and collectors can scour auctions from home via the Internet", The Gazette, Proquest #4116732, (Apr. 27, 1999), 4 pgs.
Wilson, T., "Act Globally, Think Locally", InternetWeek, Issue 789, Obtained from Proquest, Document No. 46352181, (Nov. 15, 1999), 4 p.
Wilson, Tim, "B2B Sellers Fight Back on Pricing", http://www.internetweek.com/lead/lead121200.htm InternetWeek.com, (Dec. 12, 2000), 3 pages.
Zwass, V., "Electronic Commerce: Structures and Issues", International Journal of Electronic Commerce, Fall 1996, vol. 1, No. 1, (Fall 1996), 3-23.
Alice, Michele, eBay's Mister Lister Auction Management Software, Auctionbytes—Update, No. 22, [Online]. Retrieved from the Internet: <URL: http://www.auctionbytes.com/cab/aub/y200/m09/abu0022/s05>, Sep. 24, 2000, 16 pgs.
AT&T News Release, [Online]. Retrieved from the Internet: <URL: http://www.att.com/news/1294/941221.csa.html>, Dec. 21, 1994, 2 pgs.
Auctionwatch.com, et al., AuctionWatch.com's Official Guide to Online Buying and Selling: Professional Tips, Tactics and Techniques at Your Fingertips, Prima Publishing, Roseville, CA ISBN 0-7615-52999-3, (2000), 307 pgs.
Auctionwatch: Buyer and Seller Services, [Online], Retrieved from the Internet: <URL: http://web.archive.org/web/20000830150100/http://www/auctionwatch.com>, Aug. 15, 2000, 30 pgs.
Aviation Competition: Effects on Consumers from Domestic Airline Alliances Vary, [Online]. Retrieved from the Internet: <URL: http://groups.google.com/groups?q=mileage+combine+redeem&hi=en&lr=&ie=UTF-8&oe=UTF-8&selm=GAORPTrc99037.txtp2%40us.govnews.org&rnum=6>, Feb. 2, 1999, 1 pg.
Baumann, G. W., Personal Optimized Decision / Transaction Program IBM Technical Disclosure Bulleting, Jan. 1995, 4 pgs.
Brown, Janelle, What does it take to make a buck off of Usenet?, salon.com Technology, [Online], Retrieved from the Internet: <URL: www.salon.com/tech/feature/1999/05/24/deja>, May 24, 1999, 6 pgs.
Business Roundup, Internet Week, Apr. 5, 1999, 4 pgs.
Business Wire, Bay Builder Releases Major Innovation for Online Wireless Auctions, Recovered via Dialog Database on Feb. 15, 2008, Mar. 10, 2000, 2 pgs.
Business Wire, Mediappraise Receives National Award for Web-based Technology that Enables Companies to Solve Thorny HR Problem, Business Wire, Dec. 14, 1998, 2 pgs.
Business Wire, Subasta.com, the Premier Online Auction Board for Latin America, Spain, and the Hispanic Sector of the U.S., Has Attracted Over 60,000 Viewers in Less Than Two Months, Business Wire, Jul. 16, 1999, 2 pgs.
Business Wire, Onsale: Onsale Brings Thrill of Auctions and Bargain Hunting Online; Unique Internet Retail Service Debuts With week-Long Charity Auction for the Computer Museum in Boston, Business Wire, Dialog Web. 0489267 BW0022, May 24, 1995, 3 pgs.
Business Wire, Photodisc localized internet presence to better serve global markets; Adds country-specific content and languages to its Award-Winning Websites, Business Wire, May 27, 1998, 3 pgs.
Canadian Airlines, "@wards online", Copyright (c) 1994-1997, Canadian Airlines International Ltd. {Online}. Retrieved from the Internet: <URL: http://web.archive.org/web/19970704234541/www.cdnair.ca.cpi.html>, 2 pgs.
CMP Publications, Inc., Onsale Joins Fray as Online Shopping Picks Up Speed: Internet Booms, Computer Reseller News, USA, Jun. 5, 1995, 4 pgs.
Collette, Stacy, Thin Clients Pull in Car Customers: Auto Auction Company eyes mobve to Web. (Industry Trend or Event), Computerworld recovered via dialog database on Feb. 15, 2008, Apr. 5, 1999, 2 pgs.
Continental Airlines OnePass Online Auction, transferred in 2002, 1 pg.
Continental Airlines OnePass—Requesting a Reward, transferred in, 2001, 1 pg.
DHL and UPS offer country-specific services, Transportation and Distribution, vol. 38, Issue 12, Dec. 1997, 4 pgs.

(56) References Cited

OTHER PUBLICATIONS

Europmedia, Google looking at more Country Specific Domains, Europmedia, Jan. 18, 2002, 2 pgs.

FAQs, Frequently Asked Questions About Mister Lister, [Online]. Retrieved from the Internet <URL: http://pages.ebay.co.uk/help/sellerguide/mr-lister-faq.html>, Copyright 1995-2005, 5 pgs.

Furger, Roberta, Working the Web Bazaar, PC World Magazine, May 2000, 7 pgs.

Hansell, Saul, Meg Whitman and eBay, Net Survivors, New York Times, 05/05/20025, 5 pgs.

Hauser, R., Anonymous Delivery of Good in Electronic Commerce, IBM Technical Disclosure Bulletin, 39(3), Mar. 1996, 6 pgs.

Hutchinson, Art, E-Commerce: Building a Model, Art. Communications Week recovered via Dialog Database on Feb. 15, 2008, Mar. 17, 1997, 4 pgs.

Link-Up, 17(1), Government agencies can procure materials, Jan. 2000, 1 pg.

Link-Up, (May/Jun. 2000), Service helps hospitals shop online, 2 pgs.

Merrill, K. GE Capital to Extend Integrator Buying Spree, Computer Reseller News, Jul. 1996, 3 pgs.

Mollman, Steve, "Sold! Never pay retain again. Online auctions are changing the way businesses buy and sell everything", PC Computing, Feb. 2000, 2 pgs.

Morin, Lee, M.E., Multilingual Communications Device, U.S. Appl. No. 08/200,049, filed Feb. 22, 1994, Mar. 2, 2004, 7 pgs.

Newsbytes PM, Biz to Biz Buzz, May 24, 2000, 2 pgs.

PR Newswire, Hello direct store joins eBay network of merchants, PR Newswire, New York, NY, May 23, 2002, 4 pgs.

Schneider, G. M. et al., An Introduction to Programming and Problem Solving With Pascal, An Introduction to Programming and Problem Solving with Pascal, $2^{nd}$ Edition, John Wiley & Sons, Inc., New York, NY 1982, 29 pgs.

Seminerio, Maria, When You Gotta Take Stock, Eweek, http://www.eweek.com/article2/0%2C1759%2C1243705%2C00.asp, Dec. 11, 2000, 3 pgs.

Tak, Y. et al., The SIFT Information Dissemination System, ACM Transactions on Database Systems, vol. 24, Issue 4, ACM Press, Dec. 1999, 38 pgs.

Thin Client Computing, [Online]. Retrieved from the Internet: <URL: http://web.archive.org/web/20040122033629/http://www.thinclient.net>, Jan. 22, 2004, 9 pgs.

Thin Client, (c) Wikipedia, [Online]. Retrieved from the Internet: <URL:http://en.wikipedia.org/wiki/Thin_client>, Accessed Feb. 15, 2008, 7 pgs.

Webopedia, Web Beacon, Aug. 21, 2003, 2 pgs.

Wilson, Tim, Hubs Rate Poorly on Depth, InternetWeek.com, http://www.internetweek.com/lead/lead100800.htm, Oct. 9, 2000, 4 pgs.

Winship, Tim, Combinable Miles are the Stuff of Frequent Flyers' Dreams, FrequentFlier.com-helping frequent flyers earn more miles and travel awards through free . . . , transferred in May 25, 1998, 4 pgs.

Continental Airlines, OnePass—Interactive Reward Charts, website, transferred in, 2001, 3 pgs.

Continental Airlines, ShopOnePass, Welcome to ShopOnePass, transferred in, Nov. 14, 2008, 1 pg.

PR Newswire: Stamps.com Becomes the Standard in Internet Mailing and Shipping for Top Auction Resource and Trading Sites, Stamps.com, PQDialog #449383612 [Online], Retrieved from the Internet: <URL: http://search.proquest.com/professional/docview/449383612?accountid=161862> Mar. 15, 2000, 4 pgs.

PR Newswire: Stamp.com Launches New iShip Service Offering to Automate Office-Based Shipping, PQDialog #448531788, Jun. 14, 2000, 3 pgs.

Business Wire: Yahoo! Launches PayDirect for Online Person-to-Person Payments: Relationship With CIBC National Bank Allows Consumers to Easily Send and Receive Payments Via Email, PQDialog #445932440, Jul. 31, 2000, 3 pgs.

* cited by examiner

```
┌─────────────────────────────────────────────────────┐
│        ┌──────────┬────────────┬───────────────┬────┤
│        │MY ACCOUNT│ SEND MONEY │ REQUEST MONEY │ ME │
│        └──────────┴────────────┴───────────────┴────┤
│   ┌─────────────────────────────────────────────────┤
│   │ SEND MONEY                                      │
│   │ PAY ANYONE WITH AN EMAIL ADDRESS - EVEN IF THEY DON'T HAVE
│   │   RECIPIENT'S EMAIL: [JEEVES@BRIFISHTEAS.CO.UK]  TRY
│   │              - OR - SELECT A RECIPIENT ▼
│   │          AMOUNT: [25]
│   │        CURRENCY: [U.S. DOLLARS       ▼] [?]
│1102│         TYPE:  [U.S. DOLLARS        ▼] [?]
│   │                 CANADIAN DOLLARS
│   │         SUBJECT: EUROS
│   │       (OPTIONAL) PRODUCT SEARCH (?)
│   │           NOTE:  YEN
│   │       (OPTIONAL)
└───┴─────────────────────────────────────────────────┘
```

*Fig. 11*

```
┌──────────────────────────────────────────────────────────────┐
│ CHECK PAYMENT DETAILS                      SECURE TRANSACTION│
│ PAYMENT DETAILS                                              │
│      PAY TO: JEEVES@BRIFISHTEAS.CO.UK                        │
│  USER STATUS: VERIFIED BUSINESS MEMBER (4)                   │
│         TYPE: SERVICE                                        │
│       AMOUNT: €25.00                                         │
│1202● TOTAL AMOUNT: €25.00 (EQUAL TO $39.16)                  │
│ -----------------------------------------------------------  │
│ SOURCE OF FUNDS                                              │
│    U.S. DOLLAR BALANCE: $39.16                               │
│ MORE FUNDING OPTIONS                                         │
│         1204 ──● EXCHANGE RATE AS OF SEP.29, 2002:           │
│                  1 U.S. DOLLAR = 0.638405 POUNDS STERLING    │
│ -----------------------------------------------------------  │
│ SHIPPING INFORMATION                                         │
│ ● SHIP TO [1006 ALMANOR AVE, ANDNIO PARK, CA 94025, USA (CONFIRMED)▼] ADD ADDRESS
│ ○ NO SHIPPING ADDRESS REQUIRED                               │
│              [SEND MONEY] [EDIT] [CANCEL]                    │
└──────────────────────────────────────────────────────────────┘
```

*Fig. 12*

| RECENT ACTIVITY | ALL ACTIVITY | MY AUCTIONS | HELP | | | |
|---|---|---|---|---|---|---|
| FILE | TYPE | TO/FROM | NAME/EMAIL | AMOUNT | DATE | STATUS | ACTION |
| ☐ | PAYMENT | FROM | MEDOWARE | EUR 50.00 | SEP 29, 2002 | PROCLAIMED | ACCEPT / DENY |

[FILE SELECTED ITEMS] [FILE ALL]

---

[MY ACCOUNT] [SEND MONEY] [REQUEST MONEY] [MERCHANT TOOLS] [AUCTION TOOLS]

ACCEPT OR DENY A PAYMENT — 1304

YOU HAVE RECEIVED A PAYMENT OF €50.00 EUROS FROM MEDOWARE, VERIFIED BUSINESS MEMBER (6). WHAT WOULD YOU LIKE TO DO WITH THIS PAYMENT?

○ ACCEPT THIS PAYMENT, CONVERT IT TO $47.33 U.S. DOLLARS, AND TRANSFER IT TO MY U.S. DOLLAR BALANCE. — 1304

○ ACCEPT THIS PAYMENT IN EUROS AND CREATE A EURO BALANCE IN MY PAYPAL ACCOUNT

○ DENY THIS PAYMENT

[SUBMIT] [CANCEL]

PREMIER ACCOUNT OVERVIEW
NAME: SERAPHNE KOLOSKY
EMAIL: USA@BC.COM    (ADD EMAIL)
STATUS: UNVERIFIED (0)

BALANCE | MANAGE | TRANSFER        VIEW LIMITS

1402 —
```
        U.S. DOLLAR (PRIMARY):  $217.69
                         EUR   +7.95
        CURRENT TOTAL IN U.S. DOLLARS:  $263.08
```

FORM A RETURN ON REST U.S. DOLLAR BALANCE!

RECENT ACTIVITY | ALL ACTIVITY | MY AUCTIONS    NEW!

| FILE | TYPE | TO/FROM | NAME/EMAIL | AMOUNT | DATE | STATUS | ACTION |
|---|---|---|---|---|---|---|---|
| ☐ | PAYMENT | FROM | MEDOWARE | EUR 50.00 | SEP 29, 2002 | COMPLETED | |

[FILE SELECTED ITEMS] [FILE ALL]

*Fig. 14*

| ALL ACTIVITY FROM AUG 30, 2002 TO SEP 29, 2002 - DISPLAYED MY HISTORY | | | | | | |
|---|---|---|---|---|---|---|
| | TYPE | TO/FROM | NAME/EMAIL | STATUS | GROSS | FEE | NET AMOUNT |
| 3. | CURRENCY CONVERSION (CREDIT) | TO U.S. CALLER | FROM LURE | COMPLETED | $45.39 | $0.00 | $45.39 |
| 2. | CURRENCY CONVERSION (DEBIT) | FROM EURO | TO U.S. DOLLAR | COMPLETED | -EUR 47.95 | EUR 0.00 | -EUR 47.95 |
| 1. | PAYMENT | FROM | MEDOWARE | COMPLETED | EUR 50.00 | EUR 2.05 | EUR 47.95 |

Fig. 15

| MY ACCOUNT | SEND MONEY | REQUEST MONEY | MERCHANT TOOLS | AU |
| OVERVIEW | ADD FUNDS | WITHDRAW | HISTORY | PROFILE |

PAYMENT RECEIVING PREFERENCES

BLOCK PAYMENTS FROM U.S. USERS WHO DO NOT PROVIDE A CONFIRMED ADDRESS:

○ YES
○ NO
● ASK ME

BLOCK PAYMENTS IF THEY ARE SENT TO ME IN A CURRENCY THAT I DO NOT HOLD:

○ YES
● NO, ACCEPT THEM AND CONVERT THEM TO U.S. DOLLARS
○ ASK ME

```
┌─────────────────────────────────────────────────────┐
│              ┌────────────┬────────────┬──────────────┐ │
│              │ MY ACCOUNT │ SEND MONEY │ REQUEST MONEY│ │
│              ├────────────┴┬───────────┴┬─────────┬──┤ │
│              │ OVERVIEW│ ADD FUNDS  │ WITHDRAW│ HISTORY │ P │
│              ├─────────────┴────────────┴─────────┴──┤ │
│              │ PREMIER ACCOUNT OVERVIEW              │ │
│              │ ┌───────────────────────────────────┐ │ │
│              │ │ NAME: SERAPHNE KOLOSKY            │ │ │
│              │ │ EMAIL: USA@BC.COM    (ADD EMAIL)  │ │ │
│              │ │ STATUS: UNVERIFIED (0)            │ │ │
│              │ │                                   │ │ │
│              │ │ BALANCE | MANAGE | TRANSFER   VIEW LIMITS │ │
│              │ │  ┌─────────────────────────────┐  │ │ │
│              │ │  │ U.S. DOLLAR (PRIMARY): $263.08│ │ │ │
│              │ │  │          EURO:   EUR 96.25  │  │ │ │
│              │ │  │ POUND STERLING:  £193.00    │  │ │ │
│              │ │  │ CURRENT TOTAL IN U.S. DOLLARS: $643.05│ │ │
│              │ │  └─────────────────────────────┘  │ │ │
│              │ │ EARN A RETURN ON YOUR U.S. DOLLAR BALANCE!│ │
│              │ └───────────────────────────────────┘ │ │
└─────────────────────────────────────────────────────┘
```

*Fig. 17*

LOG OUT | HELP

| MY ACCOUNT | SEND MONEY | REQUEST MONEY | MERCHANT TOOLS | AUCTION TOOLS |

OVERVIEW | ADD FUNDS | WITHDRAW | HISTORY | PROFILE

TRANSFER FUNDS

YOU MAY TRANSFER ALL OR A PORTION OF YOUR FUNDS FROM ONE CURRENCY BALANCE TO ANOTHER CURRENCY BALANCE.

TRANSFER: [ 50 ] [ U.S. DOLLAR ▼ ]
TO: [ EURO BALANCE ▼ ]
[ CALCULATE ]

BALANCES
U.S. DOLLAR: $265.00
EURO:   EUR 96.25
POUND STERLING: £295.00

RESULTS:
THE CURRENT EXCHANGE RATE IS:
50.00 U.S. DOLLARS = 48.87 EUROS

[ TRANSFER ] [ CANCEL ]

*Fig. 18*

|  |  | LOG OUT | HELP |
| --- | --- | --- | --- |

| MY ACCOUNT | SEND MONEY | REQUEST MONEY | MERCHANT TOOLS | AUCTION TOOLS |

OVERVIEW | ADD FUNDS | WITHDRAW | HISTORY | PROFILE

MANAGE CURRENCY BALANCES                               BACK TO PROFILE SUMMARIES

THE MANAGE CURRENCY TABLE DISPLAYS ALL OF THE CURRENCIES IN WHICH YOU MAY MAINTAIN A [?]
BALANCE.

| CURRENCY BALANCE | STATUS | BALANCE |
| --- | --- | --- |
| ● U.S. DOLLAR | PRIMARY OPEN | $263.00 |
| ○ EURO | OPEN | EUR 96.25 |
| ○ POUND STERLING | OPEN | £193.00 |

[OPEN BALANCE] [CLOSE BALANCE] [MAKE PRIMARY]                     [TRANSFER]

*Fig. 19*

| MY ACCOUNT | SEND MONEY | REQUEST MONEY | MERCHANT TOOLS | AUCTION TOOLS |

OVERVIEW | ADD FUNDS | WITHDRAW | HISTORY | PROFILE

WITHDRAW FUNDS BY ELECTRONIC TRANSFER                          SECURE TRANSACTION 🔒

IT USUALLY TAKES <u>3-4 BUSINESS DAYS</u> TO TRANSFER FRUNDS FROM YOUR ACCOUNT TO YOUR
BANK ACCOUNT, BUT MAY TAKE LONGER DEPENDING ON YOUR BANK'S POLICIES.

FROM THIS BALANCE: [ EUR 96.25 ▼ ]

AMOUNT: [ 50 ]

TO: [ WELLS FARGO CHECKING (UNCONFIRMED) XXXXXX5867 ▼ ]

ADD BANK ACCOUNT

MULTI CURRENCY EXCHANGES BETWEEN PARTICIPANTS

RELATED APPLICATIONS

This application is a continuation of U.S. patent application Ser. No. 13/567,902, filed Aug. 6, 2012, now U.S. Pat. No. 8,712,913 entitled "Multi Currency Exchanges Between Participants," which is a continuation of U.S. patent application Ser. No. 13/212,994, filed Aug. 18, 2011, now U.S. Pat. No. 8,249,990 entitled Multi Currency Exchanges Between Participants of a Network-Based Transaction Facility," which is a continuation of U.S. patent application Ser. No. 12/818,935, filed Jun. 18, 2010, now U.S. Pat. No. 8,055,582 entitled "Multi Currency Exchanges Between Participants of a Network-Based Transaction Facility," which is a continuation of U.S. patent application Ser. No. 10/608,525, filed Jun. 26, 2003, now U.S. Pat. No. 7,642,985 entitled "Multi Currency Exchanges Between Participants of a Network-Based Transaction Facility," all of which are incorporated herein by reference in their entirety.

TECHNICAL FIELD

The present invention relates generally to the field of e-commerce and, more specifically, to facilitating payment transactions in multiple currencies between participants.

BACKGROUND

Typically, an electronic payment system allows participants of a network-based transaction facility to collect payments online. For example, the payer may send money to the electronic payment system using a credit card or check, or funds in a payer account maintained by the electronic payment system. Recipients can store money in their accounts maintained by the electronic payment system, transfer the money to a separate bank account or have the electronic payment system cut them a check.

With the growth in international commerce, problems arise due to different monetary systems used in different countries. That is, money is generally expressed in different currencies in different countries and the value of the different currencies varies greatly.

Currency conversion is widely used to convert money from one currency into money of a different currency. However, currency conversion represents a significant economic risk to both buyers and sellers in international commerce. For example, when a buyer in the U.S. desires to buy a product in an online transaction facility from a seller in France, the buyer may use a credit card to pay the seller for the product. The credit card company may pay the seller in Euros, and then at an undetermined later date, it will bill an amount to the buyer in U.S. dollars. The amount billed to the buyer is determined by an exchange rate used at the time the credit card company settles the transaction. The time of this settlement is at the credit card company's discretion. The risk to the credit card company is minimal because the credit card company can settle the transaction when exchange rates are favorable. Thus, in this case, it is the buyer who bears the risk that the value of the buyer's currency will decline prior to this settlement.

In another example, a seller participating in an online transaction facility may decide to accept a different currency to be able to sell the product. In this case, the seller may later sell the currency to a currency trader, usually at a discount. The price the seller charges to the buyer who pays cash reflects both the cost of currency conversion and the risk that the rate used to establish the price of the product in a particular currency may have changed. This typically results in the buyer paying a higher price for the product and the seller incurring risk due to a possible change in currency exchange rates.

In yet another example, a buyer may convert from the native currency to a different second currency before the sale to be able to buy a product from a seller who only accepts payments in the second currency. In this case, the buyer can purchase goods at a price in the second currency, but cannot be certain of the value of the second currency relative to the buyer's native currency. Thus, the individual assumes the risk of devaluation of the second currency against the first currency. Further, the buyer bears the risk that the second currency may cease to be convertible into his native currency.

The above problems create inconvenience and uncertainty for participants in international commerce, thus discouraging the development of international commerce over electronic networks.

BRIEF DESCRIPTION OF THE DRAWINGS

The present invention is illustrated by way of example and not limitation in the figures of the accompanying drawings, in which like references indicate similar elements and in which:

FIGS. 11-20 are exemplary representations of various interfaces; and

DETAILED DESCRIPTION

A method and apparatus for facilitating online payment transactions in multiple currencies between users over a communications network are described. In the following description, for purposes of explanation, numerous specific details are set forth in order to provide a thorough understanding of the present invention. It will be evident, however, to one skilled in the art that the present invention may be practiced without these specific details.

System for Processing Online Payment Transactions

Figure 1:
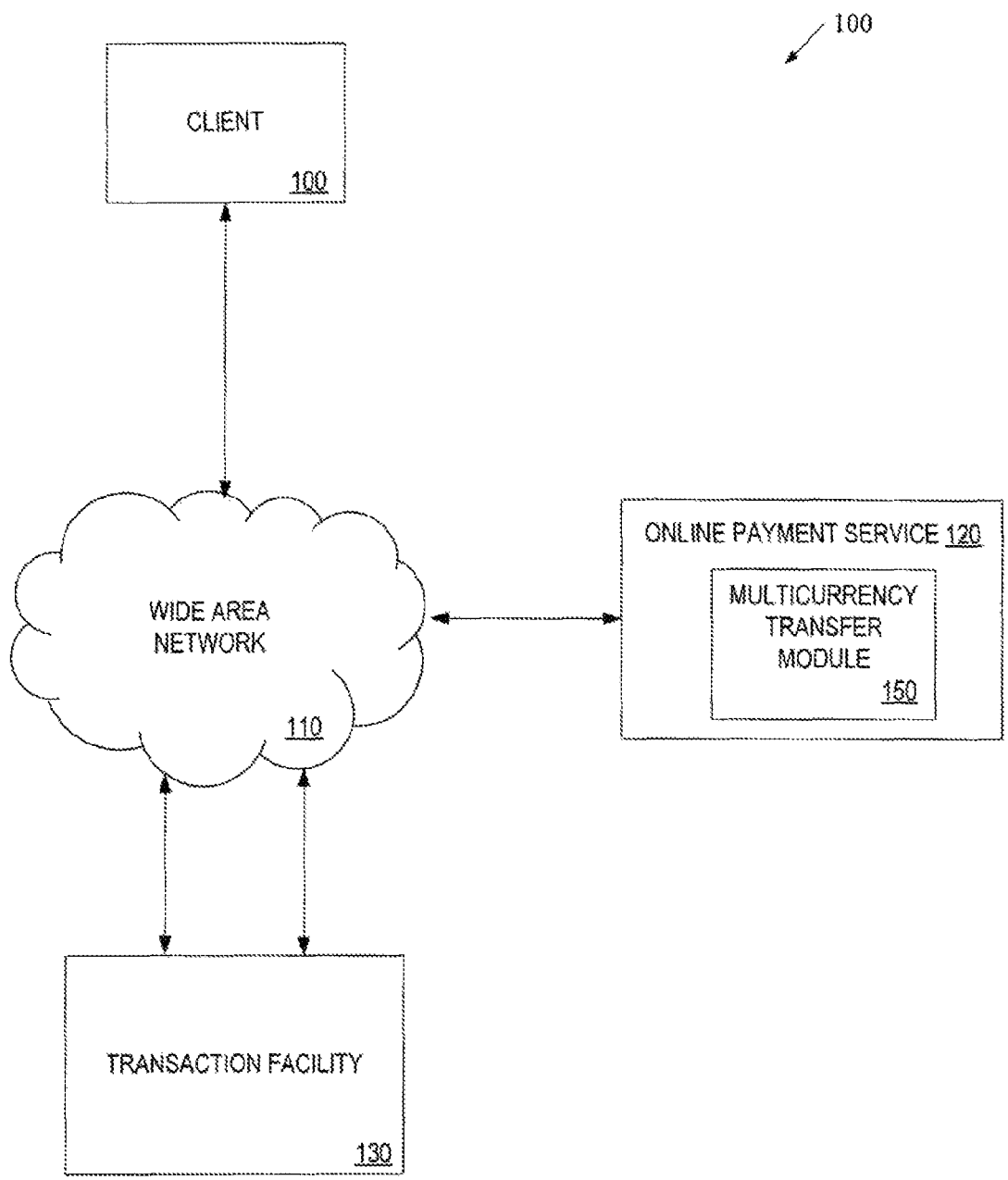
FIG. 1 is a block diagram of one embodiment of a system for processing online multi currency payment transactions between participants in a network-based transaction facility.

FIG. 1 is a block diagram of one embodiment of a system for processing online payment transactions in multiple currencies between participants in a network-based transaction facility. In this embodiment, a client 100 is coupled to a transaction facility 130 via a communications network, including a wide area network 110 such as, for example, the Internet. Other examples of networks that the client may utilize to access the transaction facility 130 include a local area network (LAN), a wireless network (e.g., a cellular network), or the Plain Old Telephone Service (POTS) network.

The client 100 represents a device that allows a user to participate in a transaction facility 130. The transaction facility 130 handles all transactions between various participants including the user of the client computer 100. In one embodiment, the transaction facility 130 may be an online auction facility represented by an auction web site visited by various participants including the user of the client computer 100. Alternatively, the transaction facility 130 may be an online retailer or wholesaler facility represented by a retailer or wholesaler web site visited by various buyers including the user of the client computer 100. In yet other embodiments, the transactions facility 130 may be any other online environment used by a participant to conduct business transactions.

The transaction facility 130 is coupled to an online payment service 120. In one embodiment, the transaction facility 130 is coupled to the online payment service 120 via a communications network such as, for example, an internal network, the wide area network 110, a wireless network (e.g., a cellular network), or the Plain Old Telephone Service (POTS) network. Alternatively, the online payment service 120 is integrated with the transaction facility 130 and it is a part of the transaction facility 130. The online payment service 120 is also coupled to the client 100 via any of the described above communications networks. The online payment service 120 is a service for enabling online payment transactions between participants of the transaction facility 130, including the user of the client computer 100.

In one embodiment, the online payment service 120 includes a multi-currency transfer module 150 that allows the participants to maintain account balances in different currencies and make online payments in different currencies in the course of business conducted in the transaction facility 130. The term "currency" as referred to herein may include, for example, denominations of script and coin that are issued by government authorities as a medium of exchange. In another example, a "currency" may also include a privately issued token that can be exchanged for another privately issued token or government script. For example, a company might create tokens in various denominations. This company issued "money" could be used by employees to purchase goods from sellers. In this case, an exchange rate might be provided to convert the company currency into currencies which are acceptable to merchants.

As will be discussed in more detail below, in one embodiment, the multi currency transfer module 150 allows the participants to make educated decisions as to which currency to choose for sending and receiving payments. In another embodiment, the multi currency module 150 provides the participants with a mechanism for managing their account balances in different currencies.

Figure 2:
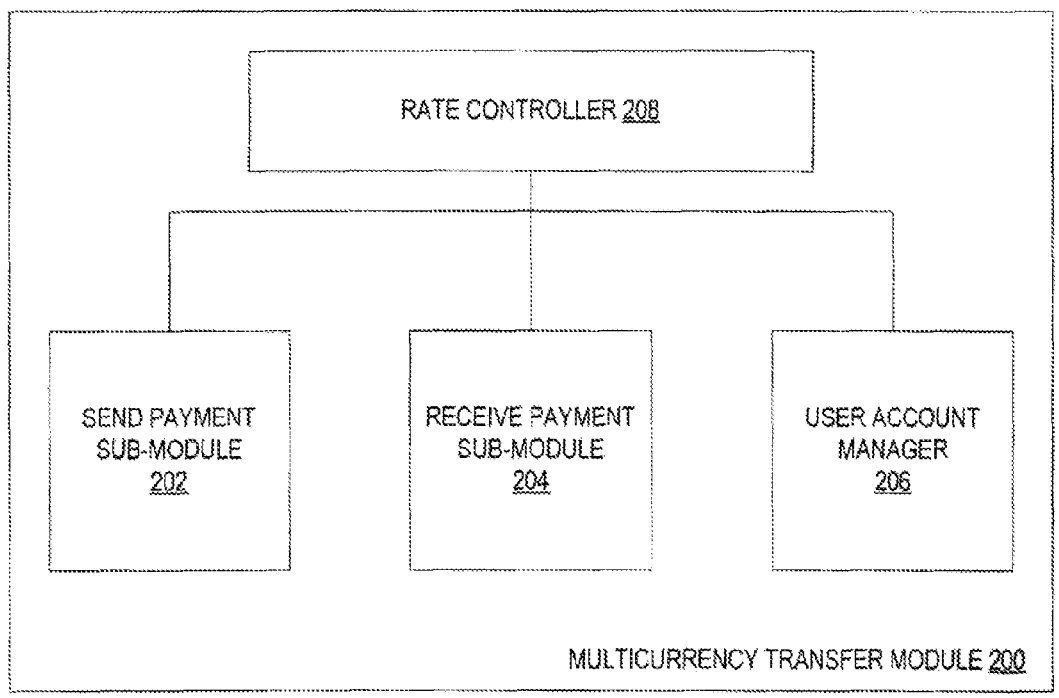
FIG. 2 is a block diagram of one embodiment of a multicurrency transfer module.

FIG. 2 is a block diagram of one embodiment of a multicurrency transfer module 200. The multicurrency transfer module 200 includes, in one embodiment, a send payment sub-module 202, a receive payment sub-module 204, a user account manager 206, and a rate controller 208.

In one embodiment, the send payment sub-module 202 is responsible for facilitating a sender selection of a currency in which a payment to a recipient is to be made, for funding the payment, for notifying a recipient about the payment, and for handling returned or denied payments. In one embodiment, if the sender does not hold an account balance in the currency that he or she selects for the payment, the send payment sub-module 202 is responsible for automatically converting funds from an existing sender balance in a different currency into the selected currency.

In one embodiment, the receive payment sub-module 204 is responsible for assisting a recipient in making a decision with respect to an acceptance of a sender payment in a specific currency, for converting the sender payment into a different currency if needed, and for notifying the sender about the recipient's decision.

In one embodiment, the user account manager 206 is responsible for allowing users to hold account balances in different currencies, for opening/removing currency balances within user accounts, and for performing transfers of funds between different currency balances within a user account.

In one embodiment, the rate controller 208 is responsible for periodically obtaining exchange rates from a third party system and using these rates to refresh rates stored in a database of the online payments service.

In one embodiment, the multi currency transfer module 200 also includes a request money sub-module that allows users to request money in any currency using a request money user interface with a list of currencies for user selection.

In one embodiment, the multicurrency transfer module 200 also includes a withdraw funds sub-module that allows users to withdraw money from any currency balance to a user bank account. If the withdrawal requires conversion, the relevant conversion data is presented to the user and the user is requested to confirm the final withdrawal.

Figure 3:
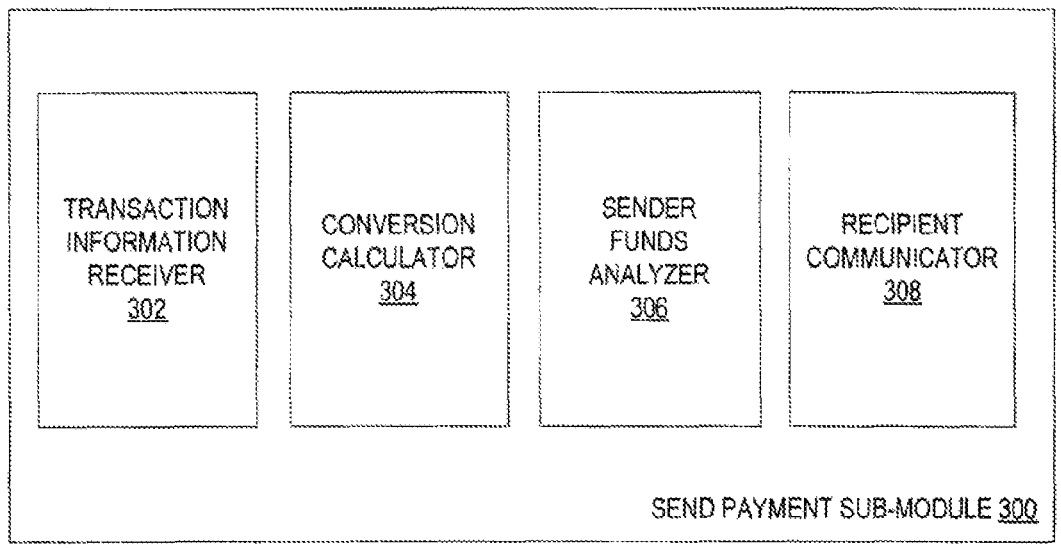
FIG. 3 is a block diagram of one embodiment of a send payment sub-module.

FIG. 3 is a block diagram of one embodiment of a send payment sub-module 300. The send payment sub-module 300 includes, in one embodiment, a transaction information receiver 302, a conversion calculator 304, a sender funds analyzer 306, and a recipient communicator 308.

The transaction information receiver 302 is responsible for communicating to a sender a user interface that facilitates user input of transaction information such as a recipient identifier (e.g., a recipient email address), a payment amount, a currency to be used for the payment, etc. In one embodiment, the user interface presents to the sender a list of currencies supported by the online payment system (e.g., U.S. dollars, Canadian dollars, Euros, pounds sterling, yen, etc.) and the sender is asked to select a specific currency from the list. The transaction information receiver 302 is further responsible for receiving transaction information entered by the sender via the user interface.

In one embodiment, if the currency selected by the sender for the payment is not a sender primary currency, the conversion calculator 304 is invoked. In another embodiment, the conversion calculator 304 is invoked only if the sender does not hold an account balance in the selected currency. Once invoked, the conversion calculator 304 is responsible for providing a current exchange rate between the sender-selected currency and the sender primary currency and for calculating an equivalent value in the sender primary currency for the payment amount. The primary currency may be, for example, a currency used in the majority of payment transactions that involved the sender. In another example, the primary currency is a currency that was specifically identified by the sender as primary. In yet another example, the primary currency may be a currency of a country in which the sender resides or a default currency provided by the online payment service 120.

The transaction information receiver 302 displays to the sender the conversion information provided by the conversion calculator 304 and requests the sender to confirm the payment in the selected currency. Once the sender sees the conversion information, the sender may decide that the current exchange rate for the selected currency is not favorable and select another currency. Alternatively, the sender may consider the current exchange rate as favorable and confirm the payment in the selected currency. In one embodiment, the sender may request, prior to confirming the payment, to view the history of currency conversion calculations from the sender's previous payment transactions to decide whether the current exchange rate is favorable.

The recipient communicator 308 is responsible for informing the recipient about the sender's payment in the selected currency, receiving data indicating whether the recipient decides to accept the payment in this currency, and communicating the recipient's decision to the sender. In one embodiment, if the recipient decides to deny the payment, the recipient communicator 308 displays to the sender a message offering to select a different currency.

The sender funds analyzer 306 is responsible for analyzing the sender's funds and determining how to fund the payment in the sender-selected currency. In one embodiment, if the sender holds an account balance in the selected currency, the sender funds analyzer 306 uses this account balance to fund the payment. Alternatively, if the sender does not hold an account balance in the selected currency, the sender funds analyzer 306 may use an account balance in the sender's primary currency to fund the payment. If the funds in the sender's primary balance are not enough to cover the payment, the sender funds analyzer 306 may ask the sender to specify an additional source for funding. This additional source may be, for example, a sender credit card, a sender bank account, a sender balance other then the primary balance, etc. In one embodiment, the sender is presented with relevant conversion information before requesting the sender's confirmation of any conversion that is necessary to fund the payment.

Figure 4:
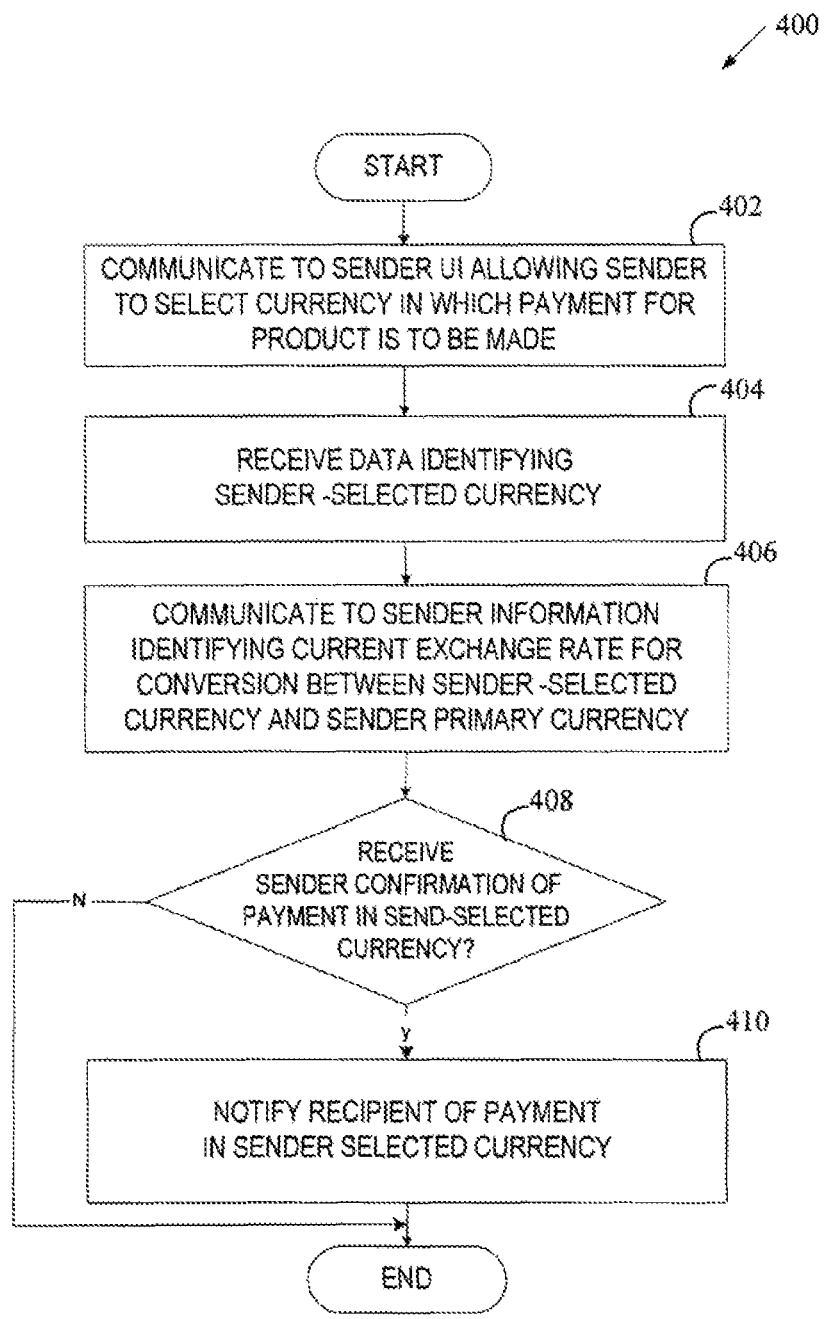
FIG. 4 is a flow diagram of one embodiment of a method for processing submissions of online multi currency payments.

FIG. 4 is a flow diagram of one embodiment of a method 400 for processing submissions of online multicurrency payments. The method 400 may be performed by processing logic, which may comprise hardware, software, or a combination of both. Processing logic may reside either in the online payment service 120, or partially or entirely in a separate device and/or system(s).

Referring to FIG. 4, the method 400 begins with processing logic communicating to a sender via a communications network a user interface that facilitates the sender input with respect to a desired currency in which a payment is to be made (processing block 402). In one embodiment, the user interface presents to the sender, for his or her selection, a list of currencies that are supported by the online payment service 120.

At processing block 404, processing logic receives data identifying the sender-selected currency from the sender via the communications network. In response, in one embodiment, processing logic determines whether the sender-selected currency is the sender's primary currency. If it is not, processing logic determines the current exchange rate for conversion between the sender-selected currency and the sender primary currency. In another embodiment, processing logic determines the current exchange rate only if the sender does not hold an account in the sender-selected currency.

Next, processing logic communicates to the sender via the communications network the current exchange rate for the conversion between the sender-selected currency and the sender primary currency (processing block 406). In one embodiment, processing logic also presents to the sender an equivalent value in the sender primary currency for the payment amount in the sender-selected currency. The presentation of the current conversion information (e.g., the exchange rate and the equivalent value) assist the sender in determining whether the terms for converting into the sender-selected currency are favorable at the present time. In addition, in one embodiment, the sender is provided with an opportunity to view the history of currency conversion calculations from previous transactions involving the sender to compare the current terms with prior terms.

Further, if processing logic receives from the sender a confirmation of the payment in the sender-selected currency (decision box 408), processing logic notifies the recipient about the payment in the sender selected currency (processing block 410).

Figure 5:
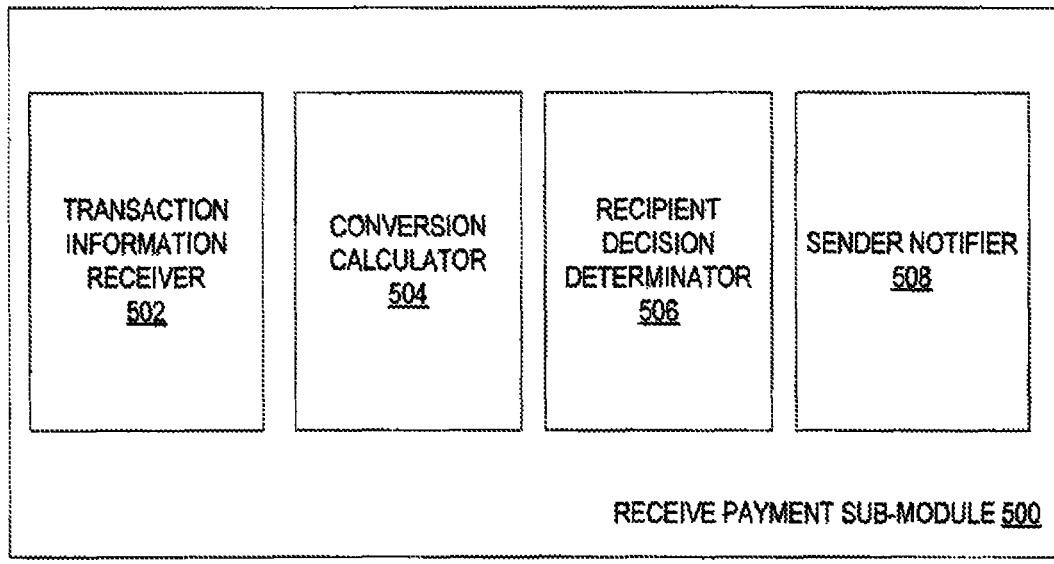
FIG. 5 is a block diagram of one embodiment of a receive payment sub-module.

FIG. 5 is a block diagram of one embodiment of a receive payment sub-module 500. The receive payment sub-module 500 includes, in one embodiment, a transaction information receiver 502, a conversion calculator 504, a recipient decision determinator 506, and a sender notifier 508.

The transaction information receiver 302 is responsible for receiving information about a sender's payment and communicating it to the recipient. The information about the sender payment may include, for example, the identifier of the sender (e.g., sender's name or email address), the payment amount, the sender-selected currency of the payment, etc.

In one embodiment, the transaction information receiver 502 is also responsible for determining whether the recipient holds an account balance in the sender-selected currency. If so, the transaction information receiver 502 is responsible for requesting a transfer of the payment amount to this account balance. If the recipient does not hold an account balance in the sender-selected currency, the conversion calculator 504 is invoked to provide a current exchange rate between the sender-selected currency and the recipient primary currency, and then the recipient decision determinator 506 communicates the current exchange rate to the recipient and requests the recipient's input with respect to an acceptance of the payment in the sender-selected currency. If the recipient accepts the payment in the sender-selected currency, the recipient decision determinator 506 requests to open a balance in the sender-selected currency within the recipient account. Alternatively, if the recipient accepts the payment in the sender-selected currency but also asks to convert it into the primary currency, the recipient decision determinator 506 performs the conversion and requests the addition of the resulting amount to the recipient's primary account balance.

In another embodiment, the recipient decision determinator 506 is responsible for requesting the recipient's input for every payment received from any sender. If the recipient specifies that he accepts the payment and wants to convert it into a different currency, the recipient decision determinator 506 is responsible for invoking the conversion calculator 504, communicating information provided by the conversion calculator 504 to the recipient, and obtaining the recipient's final confirmation of the acceptance of the payment.

In one embodiment, the conversion calculator 504 also calculates an equivalent value in a recipient primary currency (or some other currency specified by the recipient) for the payment amount in the sender-selected currency. The equivalent value is also presented to the recipient. Hence, the recipient is provided with information that can assist him in determining whether the acceptance of the payment in the sender-selected currency and/or conversion of the sender-selected currency into a different currency would be beneficial for the recipient at the present time. In addition, in one embodiment, the recipient is provided with an opportunity to view the history of currency conversion calculations from previous transactions involving the recipient to compare the current terms with prior terms.

Once the recipient specifies his decision, the sender notifier 506 notifies the sender about the recipient's decision.

Figure 6:
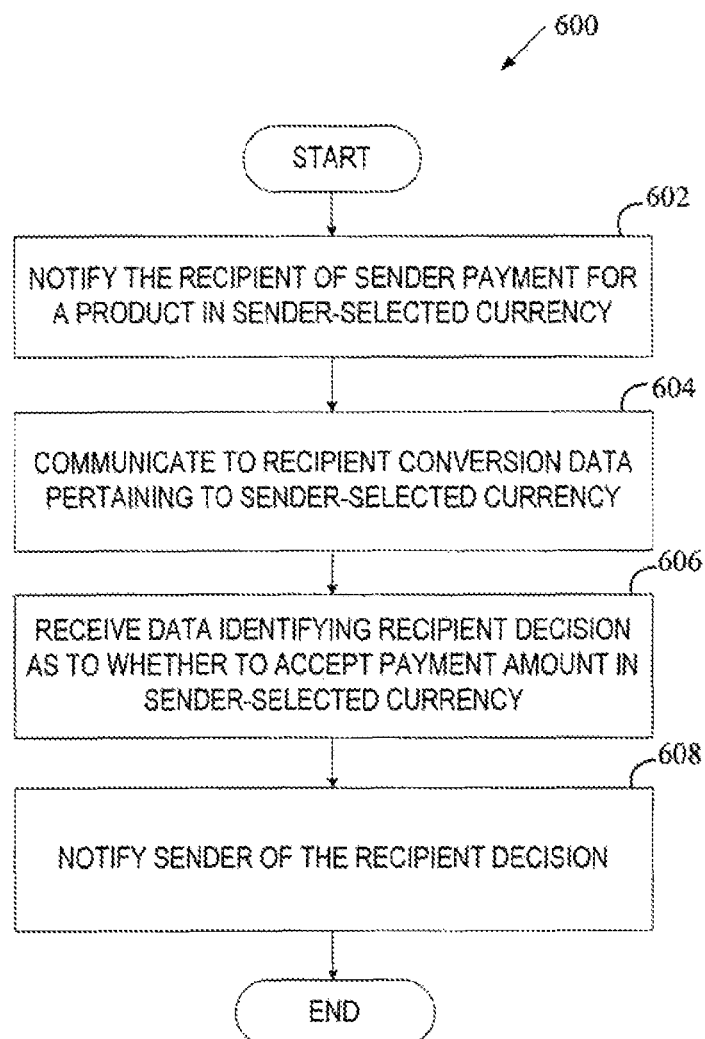
FIG. 6 is a flow diagram of one embodiment of a method for processing receipts of online multicurrency payments.

FIG. 6 is a flow diagram of one embodiment of a method 600 for processing receipts of online multi currency payments. The method 600 may be performed by processing logic, which may comprise hardware, software, or a combination of both. Processing logic may reside either in the online payment service 120, or partially or entirely in a separate device and/or system(s).

Referring to FIG. 6, the method 600 begins with processing logic communicating to a recipient via a communications network a notification of a sender payment in a sender-selected currency (processing block 602). At processing block 604, processing logic presents to the recipient via the communications network conversion data pertaining to a payment amount in the sender-selected currency. The conversion data may include an equivalent value in a recipient primary currency for the payment amount in the sender-selected currency. In one embodiment, the conversion data is communicated to the recipient if the recipient does not hold an account balance in the sender-selected currency. Alternatively, the conversion data is communicated to the recipient for every received payment.

In one embodiment, the notification about the sender payment and the conversion data is presented to the sender using a single user interface. In one embodiment, this user interface also allows the recipient to provide input for the recipient's decision with respect to an acceptance of the sender payment.

The presentation of the conversion data assists the recipient in determining which actions with respect to the payment in the sender-selected currency would be the most advantageous for the recipient at the present time. In one embodiment, the recipient may be also presented with a history of currency conversion calculations from previous transactions involving the recipient for comparison.

At processing block 606, processing logic receives from the recipient via the communications network data indicating the recipient's decision with respect to an acceptance of the payment in the sender-selected currency. In one embodiment, in which the recipient does not hold an account balance in the sender-selected currency, the recipient is provided with three decision options: (1) accept the payment and create a balance in the sender-selected currency within the recipient account, (2) accept the payment and convert it into the recipient's primary balance, and (3) deny the payment. If the recipient chooses the first option, processing logic requests a creation of a new balance within the recipient account and a transfer of the payment amount to this new balance. If the recipient chooses the second option, processing logic converts the payment amount into the recipient's primary balance and requests a transfer of the resulting amount to the recipient's primary balance.

In one embodiment, processing logic determines the recipient decision with respect to this payment based on payment receiving preferences previously provided by the recipient with respect to future payments in currencies for which the recipient does not hold a balance.

In one embodiment, processing logic assesses a receiving fee in the sender-selected currency if the recipient accepts the payment.

Afterwards, processing logic notifies the sender via the communications network of the recipient decision (processing block 608). In one embodiment, if the recipient denies the payment, processing logic presents to the sender a message offering the sender to select a different currency for the payment.

Figure 7:
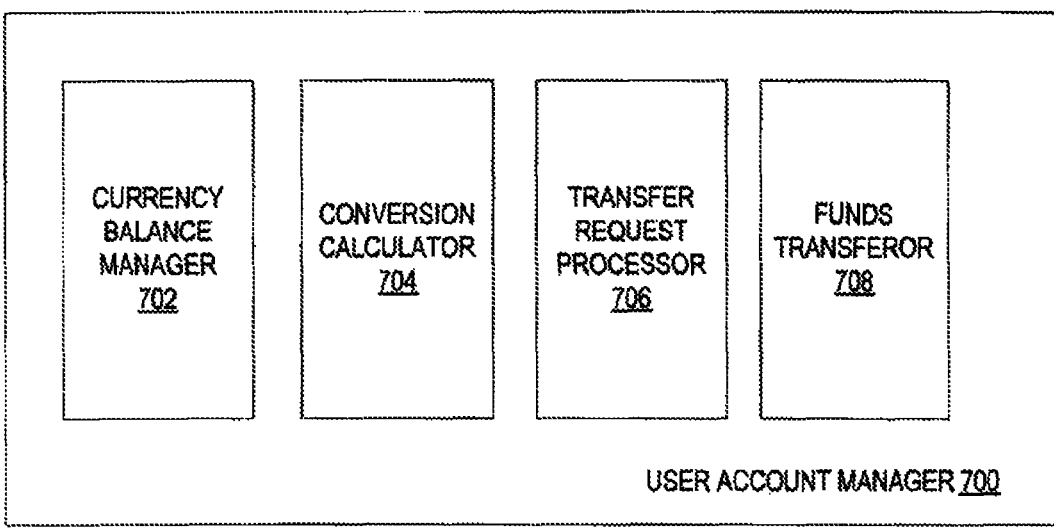
FIG. 7 is a block diagram of one embodiment of a user account manager.

FIG. 7 is a block diagram of one embodiment of a user account manager 700. The user account manager 700 includes, in one embodiment, a currency balance manager 702, a conversion calculator 704, a transfer request processor 706, and a funds transferor 708.

The currency balance manager 702 is responsible for maintaining balances in different currencies within a user account, opening new balances when needed and closing existing balances when requested by a user.

The conversion calculator 704 is responsible for providing current exchange rates and calculating amounts of potential and actual transfers.

The transfer request processor 706 is responsible for transferring funds between different currency balances within a user account. Prior to performing a transfer, the transfer request processor 706 displays conversion data provided by the conversion calculator 704 and then requests the user to confirm the transfer.

The funds transferor 708 is responsible for performing the transfer.

Figure 8:
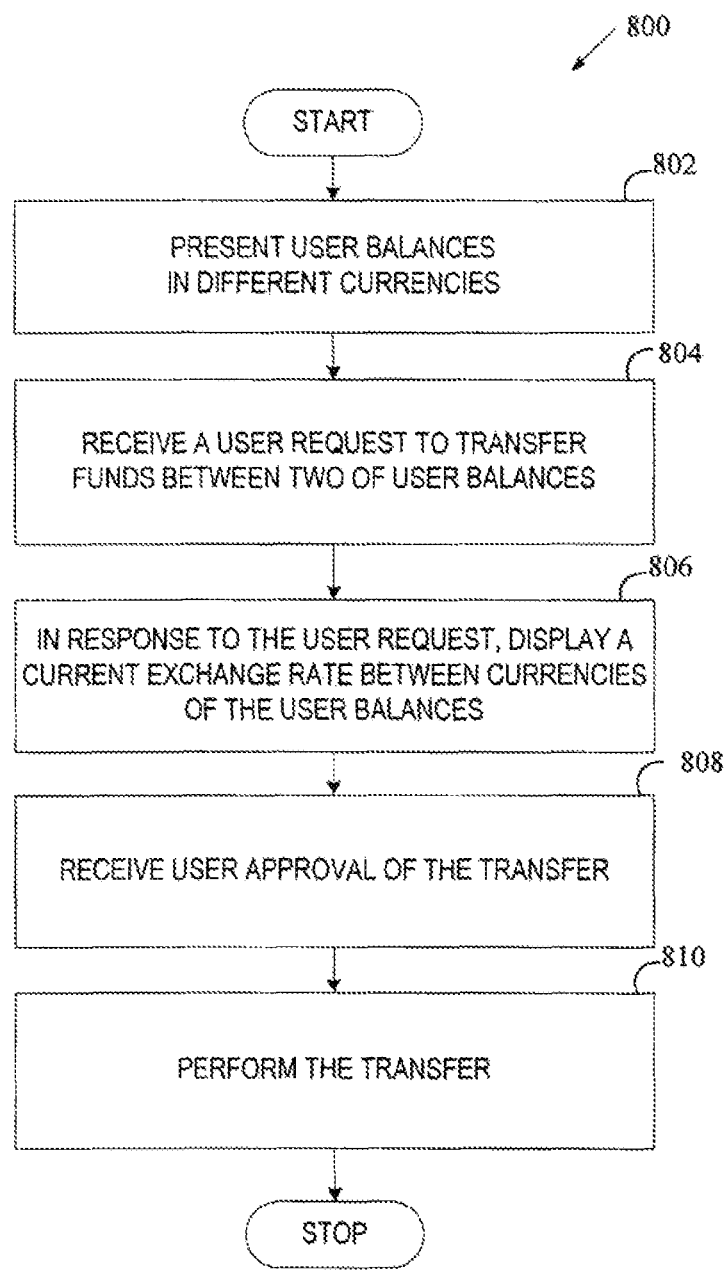
FIG. 8 is a flow diagram of one embodiment of a method for managing multicurrency balances of a user.

FIG. 8 is a flow diagram of one embodiment of a method 800 for managing multicurrency balances of a user. The method 800 may be performed by processing logic, which may comprise hardware, software, or a combination of both. Processing logic may reside either in the online payment service 120, or partially or entirely in a separate device and/or system(s).

Referring to FIG. 8, the method 800 begins with processing logic communicating to a recipient via a communications network information identifying a set of balances in different currencies within the user account (processing block 802). In one embodiment, the user is also presented with the combined total of all the balances in the user primary currency.

At processing block 804, processing logic receives from the user via the communications network data indicating a user desire to transfer funds between two currency balances. In response, processing logic presents to the user via the communications network data identifying a current exchange rate for conversion between currencies of the two balances (processing block 806).

Next, processing logic receives a user approval of the desired transfer (processing block 808) and performs the transfer (processing block 810).

As discussed above, a current exchange rate is periodically updated based on the rates obtained from a third party system. A third party may be a financial institution or any other organization that guarantees an exchange rate to the online payment service 120 during a predefined time interval. As a result, the online payment service 120 is not affected by any market fluctuations that may occur during this time interval and can provide its users with more up-to-date exchange rates.

Figure 9:
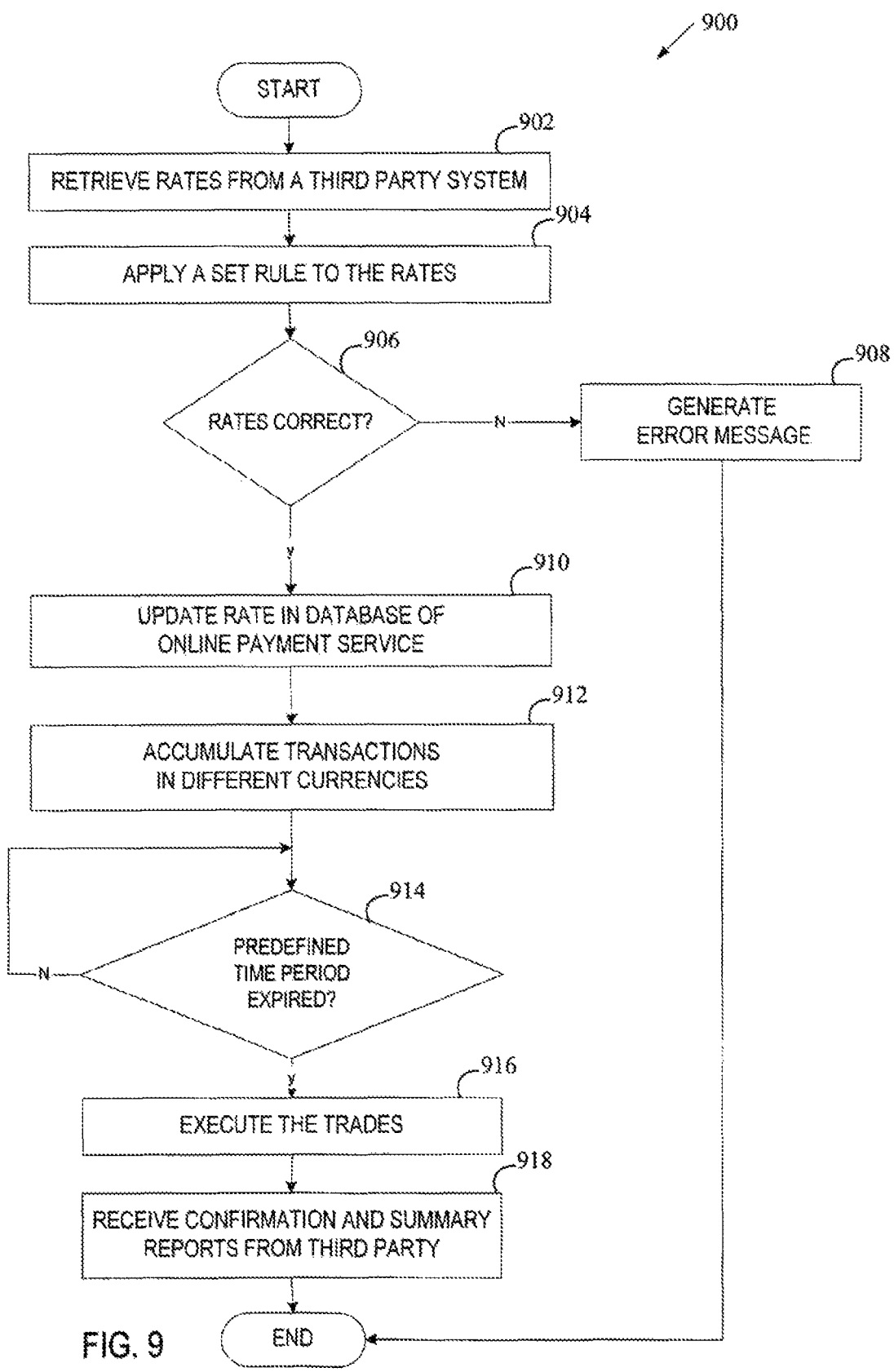
FIG. 9 is a flow diagram of one embodiment of a method for obtaining guaranteed exchange rates.

FIG. 9 is a flow diagram of one embodiment of a method 900 for obtaining guaranteed exchange rates. The method 900 may be performed by processing logic, which may comprise hardware, software, or a combination of both. Processing logic may reside either in the online payment service 120, or partially or entirely in a separate device and/or system(s).

Referring to FIG. 9, the method 900 begins with processing logic retrieving new exchange rates from a third party system (processing block 902). The new exchange rates have associated expiration dates and the online payment system is guaranteed the ability to trade against these rates within the specified window. In one embodiment, the new exchange rates are pulled via a client interface that interacts with a third party server. In one embodiment, the new exchange rates include a market exchange rate, a bid exchange rate and an ask exchange rate.

Next, processing logic applies a set of business rules to the new exchange rates (processing block 904). The set of business rules include a variety of checks (e.g., whether the new exchange rates have changed by more than 5% from the previous exchange rates) that are done to ensure that the rates are correct.

At decision box 906, processing logic determines whether the rates are correct. If not, processing logic generates an error message (processing block 908). If so, processing logic updates exchange rates currently stored in the live database of the online payment service with the new exchange rates (processing logic 910) and begins accumulating customer payment transactions in different currencies (processing block 912). When a predefined time period expires (decision box 914), processing logic requests the third party system to trade and settle the accumulated customer payment transactions (processing logic 916) and receives confirmation and summary reports once the trades are completed. In one embodiment, all transactions are funded and settled in a specific currency (e.g., U.S. dollars). In one embodiment, the trades are completed via a client interface that interacts with the third party server.

Figure 10:
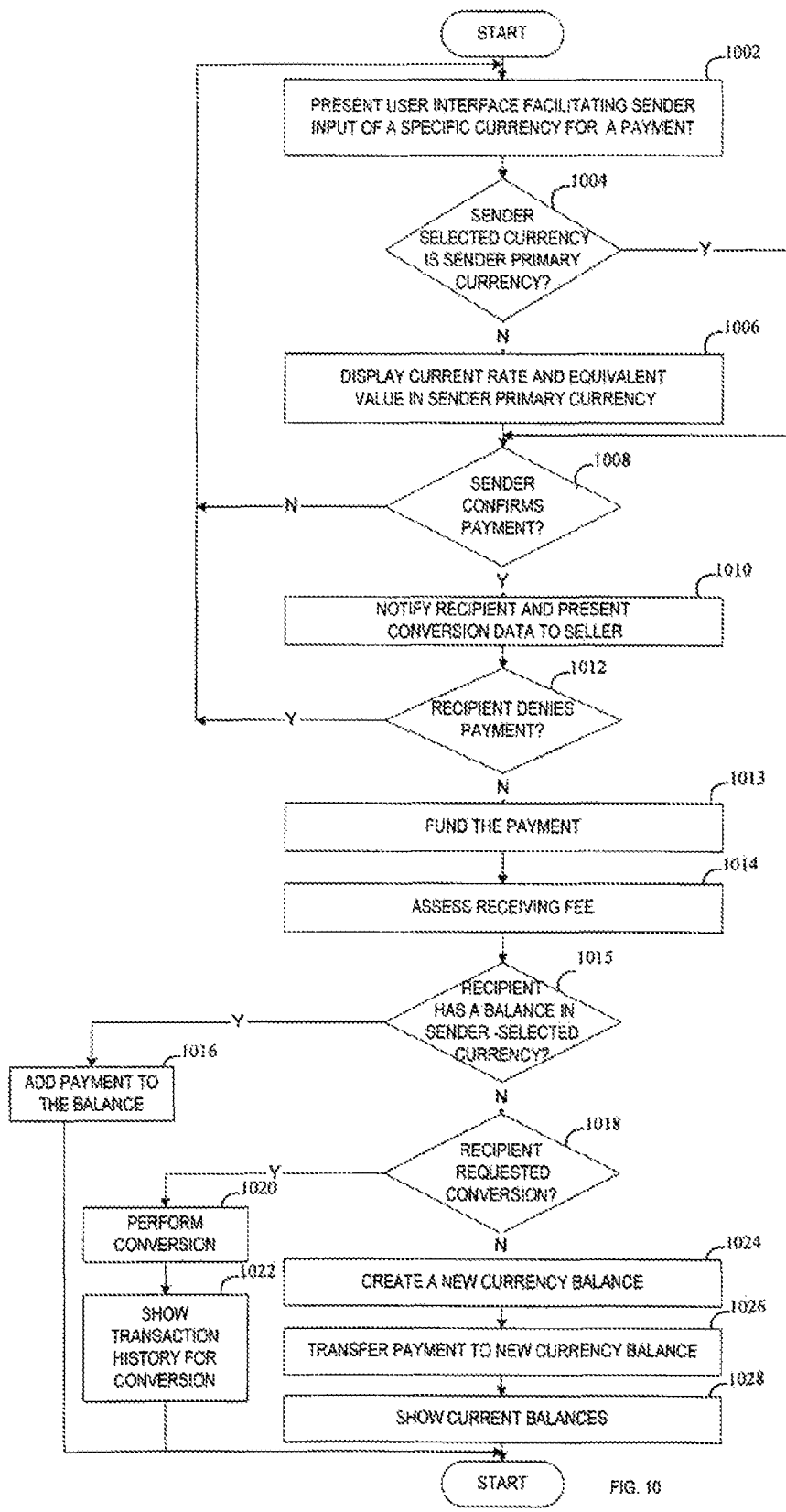
FIG. 10 is a flow diagram of one embodiment of a method for facilitating multi currency payment transactions between participants of a network-based transaction facility.

FIG. 10 is a flow diagram of one embodiment of a method 1000 for facilitating multi currency payment transactions between participants of a network-based transaction facility. The method 900 may be performed by processing logic, which may comprise hardware, software, or a combination of both. Processing logic may reside either in the online payment service 120, or partially or entirely in a separate device and/or system(s).

Referring to FIG. 10, the method 1000 begins with processing logic presenting to a sender a user interface that facilitates sender input of a specific currency for a payment (processing block 1002). Next, processing logic determines whether the sender-selected currency is a sender primary currency (decision box 1004). If so, the method 1000 proceeds directly to decision box 1008. If not, processing logic displays a current exchange rate for conversion between the sender-selected currency and the sender primary currency and an equivalent value in the sender primary currency (processing block 1006) and requests the sender to confirm the payment.

If the sender confirms the payment (decision box 1008), processing logic notifies the recipient about the payment in the sender-selected currency and presents to the recipient an equivalent value in the recipient's primary currency for the payment amount in the sender-selected currency (processing block 1010).

If the recipient denies the payment (decision box 1012), processing logic presents to the sender a message offering the sender to select a different currency.

If the recipient accepts the payment, processing logic funds the payment using one or more payment instruments of the sender (processing block 1013). In one embodiment, if the sender has an account balance in the sender-selected currency, processing logic funds the payment using this account balance. If the sender does not have such account balance, processing logic funds the payment using the sender primary account balance. If the primary account balance does not cover the payment, processing logic may use a sender credit card, a sender bank account, or other account balances within the sender account to fund the payment.

Further, if the recipient accepts the payment, processing logic assesses a receiving fee in the sender-selected currency (processing block 1014) and determines whether the recipient holds an account balance in the sender-selected currency (decision box 1015). If so, processing logic adds the payment to this balance (processing block 1016). If not, processing logic determines whether the recipient requested conversion of the accepted payment into the recipient primary currency (decision box 1018). If so, processing logic performs the conversion (processing block 1020), shows transaction history for the conversion (processing block 1022), and transfers the payment amount to the primary balance.

If the recipient did not request conversion, processing logic creates a new currency balance (processing block 1024), transfers the payment amount to the new currency balance (processing block 1026), and presents a list of existing currency balances with the total amount value to the recipient (processing block 1028).

In one embodiment, if processing logic receives a request to return the payment to the sender, processing logic performs the return in the currency in which the payment was originated using an original exchange rate.

Functions of the online payment service 120 pertaining to multi currency payments will now be described within the context of user interfaces, according to one embodiment of the present invention. Exemplary representations of the various interfaces are shown in FIGS. 11-20. While the exemplary interfaces are described as comprising markup language documents displayed by a browser, it will be appreciated that the described interfaces could comprise user interfaces presented by any Windows® client application or stand-alone application, and need not necessarily comprise markup language documents.

FIG. 11 illustrates an exemplary send money interface that enables a sender to specify which currency 1102 is to be used for a payment.

FIG. 12 illustrates an exemplary check payment details interface that displays a current exchange rate 1204 for conversion between the sender-selected currency and a sender primary currency and an equivalent value 1202 in the sender primary currency. The user interface also includes a send money button 1206 requesting the sender to confirm the payment.

FIG. 13 is an exemplary receive money interface that notifies a recipient about the sender's payment and requests him to specify his decision with respect to the payment. The receive money interface presents to the recipient the payment amount 1304 in the sender-selected currency and an equivalent value 1302 in the recipient primary currency.

FIG. 14 is an exemplary account overview interface which is presented if the recipient chose to accept the payment in the sender-selected currency. A new balance 1402 created in response to the recipient's acceptance is shown in the Balance box. The balance 1402 reflects an assessment of a receiving fee.

FIG. 15 is an exemplary transaction history interface that is presented in response to the recipient's request to accept the payment in the sender-selected currency and to convert it into the recipient primary currency. The transaction history includes 3 records: (1) the payment received in its original currency, (2) the conversion from the original currency, and (3) the conversion to the recipient's primary currency.

FIG. 16 is an exemplary payment receiving preferences interface that includes information 1602 specifying how the recipient wishes to handle payments that are sent in currencies that the recipient does not hold. As shown, the recipient can request that such payments be blocked, accepted and converted into a primary currency, or be asked about.

FIG. 17 is an exemplary account overview interface that identifies various currency balances within a user account and provides a total amount of all the balances in the primary currency.

FIG. 18 is an exemplary transfer funds interface that allows a user to transfer funds from one account balance to another. The transfer funds interface also presents a current exchange rate for the conversion, a resulting amount in the desired conversion, and a transfer button to confirm the transfer.

FIG. 19 is an exemplary manage currency interface that displays all the currency in which the user may maintain a balance, allows the user to open a new balance, remove an existing balance and make a certain balance primary.

FIG. 20 is an exemplary withdraw funds interface that allows a user to withdraw funds from any of his currency balances. Before completing the deposit, the funds are converted into the currency of the user bank account and the results are displayed to the user In summary, it will be appreciated that the above described interfaces, and underlying technologies, provide a convenient vehicle for facilitating multicurrency payment transactions in a transaction facility.

Figure 21:
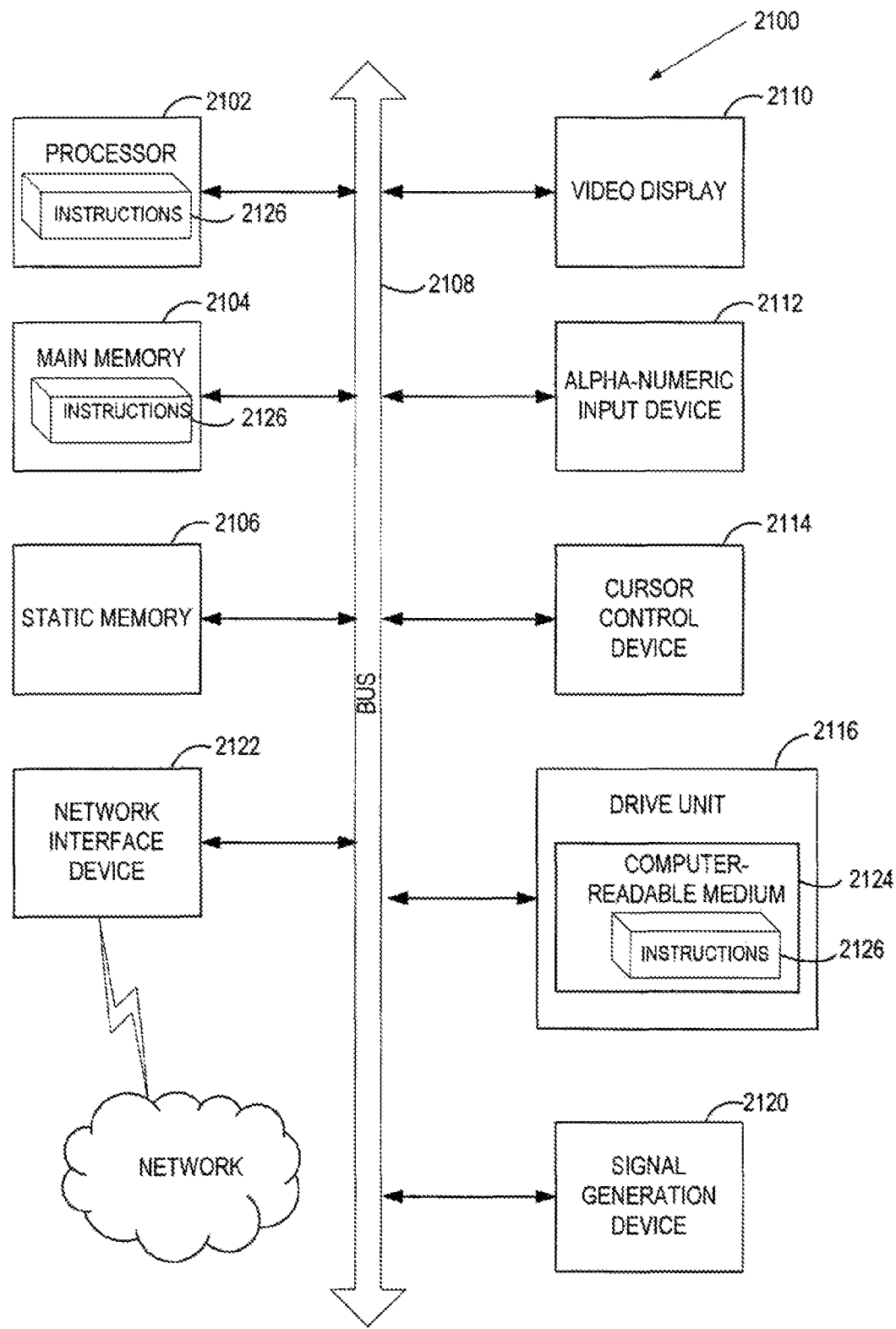
FIG. 21 is a block diagram of one embodiment of a computer system.

FIG. 21 shows a diagrammatic representation of machine in the exemplary form of a computer system 2100 within which a set of instructions, for causing the machine to perform anyone of the methodologies discussed above, may be executed. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 2100 includes a processor 2102, a main memory 2104 and a static memory 2106, which communicate with each other via a bus 2108. The computer system 2100 may further include a video display unit 2110 (e.g., a liquid crystal display (LCD) or a cathode ray tube (CRT)). The computer system 2100 also includes an alpha-numeric input device 2112 (e.g., a keyboard), a cursor control device 2114 (e.g., a mouse), a disk drive unit 2116, a signal generation device 2120 (e.g., a speaker) and a network interface device 2122.

The disk drive unit 2116 includes a computer-readable medium 2124 on which is stored a set of instructions (i.e., software) 2126 embodying anyone, or all, of the methodologies described above. The software 2126 is also shown to reside, completely or at least partially, within the main memory 2104 and/or within the processor 2102. The software 2126 may further be transmitted or received via the network interface device 2122. For the purposes of this specification, the term "computer-readable medium" shall be taken to include any medium that is capable of storing or encoding a sequence of instructions for execution by the computer and that cause the computer to perform anyone of the methodologies of the present invention. The term "computer-readable medium" shall accordingly be taken to included, but not be limited to, solid-state memories, optical and magnetic disks, and carrier wave signals.

Thus, a method and apparatus for facilitating online payment transactions in a network-based transaction facility using multiple payment instruments have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed in:

1. A computer-implemented method to provide guaranteed exchange rates in online systems, comprising:

accessing, by one or more processors, an exchange rate database storing a plurality of guaranteed exchange rates, each guaranteed exchange rate being associated with an expiration time;

applying, by one or more of the processors, a set of rules to newly received exchange rate data, the newly received exchange rate data being associated with said expiration time;

modifying, by one or more of the processors, the exchange rate database with the newly received exchange rate data based on the applying;

providing, by one or more of the processors via a web application, an option for a user to select a currency in which to make an online payment, the option including a primary currency of the user and a primary currency of a recipient, the primary currency of the user and the currency of the recipient being different;

receiving, by one or more of the processors a selection for the option from the user via the web application, the selection indicating a selected currency for the online payment;

determining, by one or more of the processors, whether the selected currency is the primary currency of the user;

accessing, by one or more of the processors, exchange rate data stored in the exchange rate database based on the selected currency, the primary currency of the user, and a time associated with the online payment based on determining that the selected currency is different from the primary currency of the user;

causing, by one or more of the processors, transitioning of the user interface to display a determined equivalent value for the online payment in the primary currency of the user based on the accessing of the exchange rate data;

determining, by one or more of the processors, whether the selected currency is the primary currency of the recipient; and causing, by one or more of the processors when the selected currency is the primary currency of the recipient, funding of the online payment to the recipient in the selected currency by converting the online payment to the selected currency based on the accessed exchange rate data from the exchange rate database prior to an expiration time of an associated guaranteed exchange rate.

2. The computer-implemented method of claim 1, further comprising causing unexpired exchange rate information to be presented to the user via the user interface.

3. The computer-implemented method of claim 2, wherein a history of currency conversion from one or more prior payment transactions of the user is provided via the user interface.

4. The computer-implemented method of claim 2, further comprising:
calculating, by one or more of the processors the equivalent value for the online payment in the primary currency of the user.

5. The computer-implemented method of claim 1, further comprising:
requesting, via the user interface, the user to confirm the online payment in the primary currency of the recipient; and
receiving, via the user interface, confirmation to proceed with processing the online payment in the primary currency of the recipient.

6. The computer-implemented method of claim 1, further comprising:
receiving an indication of acceptance or denial of the online payment; and
communicating, via the user interface, the indication of the acceptance or denial to the user.

7. The computer-implemented method of claim 6, further comprising:
in response to receiving a denial of the online payment, allowing the user to make the online payment via the user interface using a different online payment option.

8. The computer-implemented method of claim 1, further comprising:
determining, by the one or more processors, when a balance of an account of the user is sufficient to cover the online payment; and
based on the balance not being sufficient, requesting the user to provide an additional source of payment via the user interface.

9. The computer-implemented method of claim 1, wherein the user interface facilitates input of the selected currency by listing one or more supported currencies.

10. The computer-implemented method of claim 1, further comprising:
when the selected currency is the primary currency of the user, causing, by one or more of the processors, a conversion from the selected currency to the primary currency of the recipient based on exchange rate data stored in the exchange rate database after funds for the online payment are provided from an account of the user.

11. The computer-implemented method of claim 1, further comprising, assessing a fee in the primary currency of the user based on the funding of the online payment.

12. The computer-implemented method of claim 1, wherein the primary currency of the user comprises a privately issued token that can be exchanged for another privately issued token or government script.

13. A computer system to provide guaranteed exchange rates in online systems, comprising:
an exchange rate database storing a plurality of guaranteed exchange rates, each guaranteed exchange rate being associated with an expiration time;
a non-transitory memory storing exchange rate data from the exchange rate database and instructions; and
one or more hardware processors coupled to the non-transitory memory and configured to read the instructions from the non-transitory memory to perform operations comprising:
applying a set of rules to newly received exchange rate data, the newly received exchange rate data being associated with said expiration time;
modifying the exchange rate database with the newly received exchange rate data based on the applying;
providing, via a web application, an option for a user to select a currency in which to make an online payment, the option including a primary currency of the user and a currency of a recipient, the primary currency of the user and the currency of the recipient being different;
receiving a selection for the option from the user via the web application, the selection indicating a selected currency for the online payment;
determining whether the selected currency is the primary currency of the user or the currency of the recipient;
accessing exchange rate data stored in the exchange rate database based on the selected currency, the primary currency of the user, and a time associated with the online payment based on determining that the selected currency is different from the primary currency of the user;
causing transitioning of the user interface to display a determined equivalent value for the online payment in the primary currency of the user based on the accessing; and
causing, when the selected currency is the currency of the recipient, funding of the online payment to the recipient in the selected currency by converting the online payment to the selected currency based on the accessed exchange rate data from the exchange rate database prior to an expiration time of an associated guaranteed exchange rate.

14. A non-transitory machine-readable storage medium having stored thereon machine-readable instructions executable to cause a machine to perform operations comprising:
accessing said exchange rate database storing a plurality of guaranteed exchange rates, each guaranteed exchange rate being associated with an expiration time;
applying a set of rules to newly received exchange rate data, the newly received exchange rate data being associated with an expiration time;
modifying the exchange rate database with the newly received exchange rate data based on the applying;
providing, via a web application, an option for a user to select a currency in which to make an online payment, the option including a primary currency of the user and a currency of a recipient, the primary currency of the user and the currency of the recipient being different;
receiving a selection for the option from the user via the web application, the selection indicating a selected currency for the online payment;
determining whether the selected currency is the primary currency of the user or the currency of the recipient;
accessing exchange rate data stored in the exchange rate database based on the selected currency, the primary currency of the user, and a time associated with the online payment based on determining that the selected currency is different from the primary currency of the user;

causing transitioning of the user interface to display a determined equivalent value for the online payment in the primary currency of the user based on the accessing; and causing, when the selected currency is the currency of the recipient, funding of the online payment to the recipient in the selected currency by converting the online payment to the selected currency using an exchange rate based on the accessed exchange rate data from the exchange rate database, prior to an expiration time of an associated guaranteed exchange rate.

15. The non-transitory machine-readable storage medium of claim 14, the operations further comprising:

causing unexpired exchange rate information to be presented to the user via the user interface.

16. The non-transitory machine-readable storage medium of claim 15, the operations further comprising:

calculating the equivalent value for the online payment in the primary currency of the user.

17. The non-transitory machine-readable storage medium of claim 14, the operations further comprising:

receiving an indication of acceptance or denial of the online payment; and communicating, via the user interface, the indication of the acceptance or denial to the user.

18. The non-transitory machine-readable storage medium of claim 17, the operations further comprising:

in response to a denial of the online payment, allowing the user to make the online payment using a different online payment mechanism via the user interface.

19. The non-transitory machine-readable storage medium of claim 14, the operations further comprising:

determining when a balance of an account of the user is sufficient to cover the online payment; and based on the balance not being sufficient, requesting the user to provide an additional source of payment via the user interface.

20. The non-transitory machine-readable storage medium of claim 14, the operations further comprising:

causing a conversion from the selected currency to the currency of the recipient based on exchange rate data stored in the exchange rate database after funds for the online payment are provided from an account of the user.

* * * * *